US011940110B2

(12) United States Patent
Nozue et al.

(10) Patent No.: US 11,940,110 B2
(45) Date of Patent: Mar. 26, 2024

(54) VEHICLE-MOUNTED LIGHT SOURCE UNIT

(71) Applicant: KOITO MANUFACTURING CO., LTD., Tokyo (JP)

(72) Inventors: Shuhei Nozue, Shizuoka (JP); Ryujiro Ikuta, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/267,182

(22) PCT Filed: Dec. 10, 2021

(86) PCT No.: PCT/JP2021/045520
§ 371 (c)(1),
(2) Date: Jun. 14, 2023

(87) PCT Pub. No.: WO2022/131155
PCT Pub. Date: Jun. 23, 2022

(65) Prior Publication Data

US 2024/0044468 A1 Feb. 8, 2024

(30) Foreign Application Priority Data

Dec. 15, 2020 (JP) ................................ 2020-207575

(51) Int. Cl.
*F21S 41/19* (2018.01)
*F21S 41/143* (2018.01)
*F21S 41/153* (2018.01)

(52) U.S. Cl.
CPC ............. *F21S 41/19* (2018.01); *F21S 41/143* (2018.01); *F21S 41/153* (2018.01)

(58) Field of Classification Search
CPC ........ F21S 41/19; F21S 41/143; F21S 41/153; F21S 41/192; F21S 41/198
See application file for complete search history.

(56) References Cited

U.S. PATENT DOCUMENTS

| | | | | |
|---|---|---|---|---|
| 8,523,416 B2 * | 9/2013 | Ohmi | F21S 41/192 362/545 |
| 10,006,602 B2 * | 6/2018 | Abe | F21S 41/295 |
| 2020/0182433 A1 * | 6/2020 | Hemon | F21S 45/48 |

FOREIGN PATENT DOCUMENTS

| | | |
|---|---|---|
| JP | 2016-60060 A | 4/2016 |
| WO | 2019/176869 A1 | 9/2019 |

OTHER PUBLICATIONS

International Search Report for PCT/JP2021/045520 dated Jan. 25, 2022.

* cited by examiner

*Primary Examiner* — Matthew J. Peerce
(74) *Attorney, Agent, or Firm* — Sughrue Mion, PLLC

(57) ABSTRACT

A vehicle-mounted light source unit (LU) includes a heat sink (80) including a first rib (94L) and a second rib (94R), and a substrate (50) including a first through-hole (51L) and a second through-hole (51R) into which the first rib (94L) and the second rib (94R) are fitted. Each of the first rib (94L) and the second rib (94R) includes an extending portion (94E), and a protruding portion (94P) that protrudes from a part of the extending portion (94E) to a side on which the first rib (94L) and the second rib (94R) approach each other or are away from each other in a left-right direction. Each of the first through-hole (51L) and the second through-hole (51R) includes first facing portions facing both end surfaces of the extending portion (94E) and a second facing portion facing an end surface of the protruding portion (94P).

6 Claims, 12 Drawing Sheets

VEHICLE-MOUNTED LIGHT SOURCE UNIT

CROSS REFERENCE TO RELATED APPLICATIONS

This application is a National Stage of International Application No. PCT/JP2021/045520 filed Dec. 10, 2021, claiming priority based on Japanese Patent Application No. 2020-207575 filed Dec. 15, 2020.

TECHNICAL FIELD

The present invention relates to a vehicle-mounted light source unit, and particularly relates to a vehicle-mounted light source unit including a substrate on which a light source is mounted and a holding member that holds the substrate.

BACKGROUND ART

As the above-described vehicle-mounted light source unit, for example, a vehicle-mounted light source unit described in Patent Literature 1 below is known. The vehicle-mounted light source unit described in Patent Literature 1 includes a substrate on which a light source is mounted and a heat sink as a holding member that holds the substrate, and the heat sink is provided with one rib protruding to the substrate side on each of the left and right sides. In the vehicle-mounted light source unit described in Patent Literature 1, the substrate is held by the heat sink when the ribs are inserted into cutouts formed on the above-described substrate.

In the vehicle-mounted light source unit described in Patent Literature 1, the rib has a rectangular shape when viewed along the height direction of the rib, and the length from the upper end to the lower end perpendicular to the height direction of the rib is substantially equal to the entire length along an up-down direction of the above-described cutout. Accordingly, in the vehicle-mounted light source unit described in Patent Literature 1, the relative movement between the substrate and the heat sink in the up-down direction is restricted, and the substrate is positioned with respect to the heat sink in the up-down direction.

Note that in the vehicle-mounted light source unit described in Patent Literature 1, there is a gap between a side portion of the rib in a left-right direction and a side wall of the substrate defining the cutout.

[Patent Literature 1] WO 2019/176869 A1

SUMMARY OF INVENTION

In the vehicle-mounted light source unit described in Patent Literature 1 described above, as described above, since there is a gap between the side portion of the rib in the left-right direction and the side wall of the substrate, it is difficult to accurately position the substrate and the heat sink in the left-right direction only with the rib. Therefore, in Patent Literature 1 described above, through-holes are formed in the substrate, pins are erected on the heat sink, and the pins are inserted into the above-described through-holes to achieve positioning in the left-right direction.

However, when the pins are provided on the heat sink in addition to the ribs as in Patent Literature 1 described above, the shape of the heat sink becomes complicated, which leads to an increase in manufacturing cost. Therefore, there is a demand for achieving positioning in the up-down direction and the left-right direction without providing the pins as described above.

As a method for satisfying this demand, for example, it is conceivable to increase the width of the above-described ribs having a rectangular shape in the left-right direction to cause the side portions of the two ribs having a rectangular shape to abut on the side walls of the substrate, and pinch the substrate with the two ribs. However, in this case, since the substantially entire length of the upper end, the substantially entire length of the lower end, and the substantially entire length of the side portions of the ribs abut on the side walls of the substrate, the area of the abutment portions between the substrate and the ribs increases. In order to emit light emitted from the light source mounted on the substrate in a desired direction, it is necessary to increase the accuracy of surface machining on the above-described abutment portions to suppress rattling between the substrate and the heat sink at the abutment portions. However, when the area of the abutment portions is large, it is necessary to increase the accuracy of surface machining over a wide range, and it is difficult to accurately perform surface machining over such a wide range. Accordingly, the method of increasing the width of the ribs having a rectangular shape in the left-right direction as described above is likely to be affected by the accuracy of surface machining, and may cause optical axis misalignment.

Hence, as a method of reducing the area of the abutment portions while causing the ribs to abut on the side walls of the substrate in the up-down direction and the left-right direction, for example, it is conceivable to reduce the size of the ribs having a rectangular shape. However, in this case, the rigidity of the ribs may be weakened and the ribs may be deformed. When the ribs are deformed in this manner, positioning accuracy may be decreased. Alternatively, as another method of reducing the area of the abutment portions while causing the ribs to abut on the side walls of the substrate in the up-down direction and the left-right direction, for example, it is conceivable to cause ribs having a columnar shape to abut on the side walls of the substrate. However, in this case, the abutment portions between the ribs and the side walls of the substrate are line contact, which causes stress concentration on the abutment portions. Such stress concentration may cause deformation of the ribs and the substrate starting from the abutment portions, and the deformation of the ribs and the substrate may cause a decrease in positioning accuracy.

The present invention has been made in view of the above-described circumstances, and an object is to provide a vehicle-mounted light source unit capable of suppressing a decrease in positioning accuracy between a substrate on which a light source is mounted and a holding member that holds the substrate and capable of suppressing optical axis misalignment.

In order to achieve the above-described object, a vehicle-mounted light source unit of the present invention includes: a holding member that includes a pair of ribs; and a substrate that is disposed on the holding member, includes a pair of fitting portions into which the respective ribs are fitted, and on which a light source is mounted, in which when viewed along a height direction of each of the ribs, each of the ribs includes: an extending portion that extends in a direction different from a direction in which the pair of ribs is arranged, and has both end surfaces having a planar shape, and a protruding portion that protrudes from a part of the extending portion to a side on which the pair of ribs approach each other or are away from each other in a direction different from an extending direction of the extending portion, and has an end surface having a planar shape having an in-plane direction different from an in-plane direction of both end surfaces of the extending portion, and each of the fitting portions includes: a pair of first facing portions facing both end surfaces of the extending portion, and a second facing portion facing the end surface of the protruding portion.

With this vehicle-mounted light source unit, when viewed along the height direction of each rib, each rib includes the protruding portion that protrudes to the side on which the pair of ribs approach each other or are away from each other in a predetermined direction, and each of the pair of fitting portions includes the second facing portion facing the end surface of the above-described protruding portion. Accordingly, when the substrate moves along the above-described predetermined direction with respect to the holding member, the movement of the substrate along the above-described predetermined direction with respect to the holding member is restricted by the abutment between the end surface of the protruding portion of one rib and the second facing portion of one fitting portion to which the rib is fitted or the abutment between the end surface of the protruding portion of the other rib and the second facing portion of the other fitting portion to which the rib is fitted, and the substrate is positioned with respect to the holding member in the predetermined direction.

In addition, with the vehicle-mounted light source unit, when viewed along the height direction of each rib, each rib includes the extending portion extending in a direction different from the above-described predetermined direction, and each of the pair of fitting portions includes a pair of first facing portions facing both end surfaces of the above-described extending portion. In addition, the in-plane direction of both end surfaces of the extending portion is different from the in-plane direction of the end surface of the protruding portion. Accordingly, when the substrate moves with respect to the holding member along the direction perpendicular to both the above-described predetermined direction and the above-described height direction, the substrate is restricted from moving with respect to the holding member along the direction perpendicular to both the above-described predetermined direction and the above-described height direction by the abutment between one of both end surfaces of the extending portion and one of the pair of first facing portions of the fitting portion or the abutment between the other of both end surfaces of the extending portion and the other of the pair of first facing portions of the fitting portion, and the substrate is positioned with respect to the holding member in the direction perpendicular to both the above-described predetermined direction and the above-described height direction.

In addition, with the vehicle-mounted light source unit, since both end surfaces having a planar shape of the extending portion face the first facing portions of the fitting portion, both end surfaces of the extending portion are substantially in surface contact with the first facing portions. In addition, since the end surface having a planar shape of the protruding portion faces the second facing portion of the fitting portion, the end surface of the protruding portion is substantially in surface contact with the second facing portion. Accordingly, for example, unlike the case where the rib has a columnar shape, it is possible to suppress line contact between the rib and the fitting portion and to suppress stress concentration on the abutment portion. Accordingly, deformation of the ribs and the substrate starting from the abutment portion can be suppressed, and a decrease in positioning accuracy between the substrate and the holding member can be suppressed.

In addition, with the vehicle-mounted light source unit, the rib has the configuration in which the protruding portion is added to the extending portion. For this reason, in order to perform positioning with the rib in both the above-described predetermined direction and the direction perpendicular to the predetermined direction, for example, the rib can be enlarged and the rigidity of the rib can be secured as compared with the case where the rectangular rib is generally reduced and the entire side surface of the rib is brought into abutment with the fitting portion. Hence, deformation of the ribs can be suppressed, and a decrease in positioning accuracy can be suppressed.

In addition, with the vehicle-mounted light source unit, since both ends of the extending portion abut on the fitting portion of the substrate, the abutment area between the rib and the fitting portion in the extending direction can be reduced as compared with the case where the entire end surface of the rib in the extending direction of the extending portion abuts on the fitting portion. In addition, with the vehicle-mounted light source unit, since the end surface of the protruding portion protruding from a part of the extending portion abuts on the fitting portion of the holding member, the abutment area between the rib and the fitting portion in the protruding direction of the protruding portion can be reduced as compared with the case where the entire end surface of the rib in the protruding direction of the protruding portion abuts on the fitting portion. As described above, with the vehicle-mounted light source unit, since the abutment area between the rib and the fitting portion can be reduced, it is hardly affected by the accuracy of surface machining, and it is possible to suppress the optical axis misalignment of the light emitted from the light sources.

As described above, with the vehicle-mounted light source unit, it is possible to suppress a decrease in positioning accuracy between the substrate and the holding member and to suppress the optical axis misalignment.

In addition, when viewed along the height direction of each of the ribs, the position of the end surface of the protruding portion in the extending direction is preferably between both end surfaces of the extending portion.

The above-described fitting portion may be, for example, a through-hole or a cutout formed in the substrate. In a case where the fitting portion is a through-hole or a cutout, when the through-hole or the cutout is formed in the substrate, R may be formed at a corner of the through-hole or the cutout in the above-described extending direction. Also in such a case, when viewed along the height direction of the rib, when the position of the tip of the protruding portion in the above-described extending direction is between both end surfaces of the extending portion, the end surface of the protruding portion can be avoided from abutting on the above-described R, and the end surface of the protruding portion and the fitting portion can be easily brought into surface contact with each other.

Note that when the position of the tip of the protruding portion in the above-described extending direction is between both end surfaces of the extending portion, when viewed along the height direction of the rib, the protruding portion may extend in a direction perpendicular to the extending direction from the central portion of the extending portion in the extending direction.

In this manner, by protruding the protruding portion in the direction perpendicular to the extending direction from the central portion of the extending portion in the extending direction, it is possible to more effectively avoid the protruding portion from abutting on the R formed at the corners of the above-described through-hole or the above-described cutout, which is a fitting portion, in the above-described extending direction.

In addition, the protruding portion of each of the ribs preferably protrudes from a part of the extending portion to a side on which the pair of ribs approach each other.

A large number of wirings connected to a light source tend to be formed in the central portion of the substrate on which the light source is mounted. Therefore, in order to avoid such wiring and the like, it is preferable to form each of the above-described pair of fitting portions on the side close to the ends of the substrate. When each of the fitting portions is formed on the side close to the ends of the substrate, the length of the inner region of the substrate from one fitting portion to the other fitting portion tends to be longer than the length of the outer region of the substrate from each of the fitting portions to the outer edge of the substrate. For this reason, rigidity in the inner region of the substrate tends to be stronger than rigidity in the outer region of the substrate. When the protruding portions of the ribs are made to protrude to the side where the pair of ribs approach each other, the tips of the respective protruding portions can be brought into abutment with the inner region of the substrate having high rigidity. Accordingly, it is possible to suppress deformation and the like of the substrate as compared with the case where the protruding portions of the respective ribs protrude to the side on which the pair of ribs are away from each other.

In addition, the protruding direction of the protruding portion of each of the ribs may be parallel to the left-right direction, and the abutment area between the end surface of the extending portion and the first facing portion may be larger than the abutment area between the end surface of the protruding portion and the second facing portion.

Since vibration in the up-down direction during traveling of the vehicle tends to be larger than vibration in the left-right direction, the rib is more likely to receive a stronger force in a direction parallel to the up-down direction during traveling of the vehicle. In a case where the protruding direction of the protruding portion of the rib is parallel to the left-right direction in a state where the vehicle-mounted light source unit is mounted on the vehicle, the extending direction of the extending portion can be considered as a direction substantially parallel to the up-down direction. When the abutment area between the end surface of the extending portion and the first facing portion is made larger than the abutment area between the end surface of the protruding portion and the second facing portion, the rigidity of the end surface of the extending portion to which the force due to vibration in the up-down direction is mainly applied can be made higher than the rigidity of the end surface of the protruding portion to which the force due to the vibration in the left-right direction is mainly applied. Hence, deformation of the rib during traveling of the vehicle can be more effectively suppressed.

In addition, the protruding direction of the protruding portion of each of the ribs may be parallel to the left-right direction, and the length along the extending direction of the extending portion may be longer than the length along the protruding direction of the protruding portion.

By increasing the length along the extending direction of the extending portion in this manner, the rigidity of the extending portion can be increased. For this reason, even when a strong force is applied to the rib in the up-down direction during traveling of the vehicle, deformation of the rib can be more effectively suppressed.

As described above, according to the present invention, there can be provided a vehicle-mounted light source unit capable of accurately positioning a substrate on which a light source is mounted and a holding member that holds the substrate and capable of suppressing optical axis misalignment.

DESCRIPTION OF EMBODIMENTS

Aspects for carrying out the vehicle-mounted light source unit according to the present invention will be illustrated below together with the accompanying drawings. The embodiments illustrated below are for facilitating the understanding of the present invention, and are not for limiting the interpretation of the present invention. The present invention can be changed or modified from the embodiments below without departing from the spirit. In addition, in the present specification, the dimensions of each member may be exaggerated for ease of understanding.

First Embodiment

Figure 1:
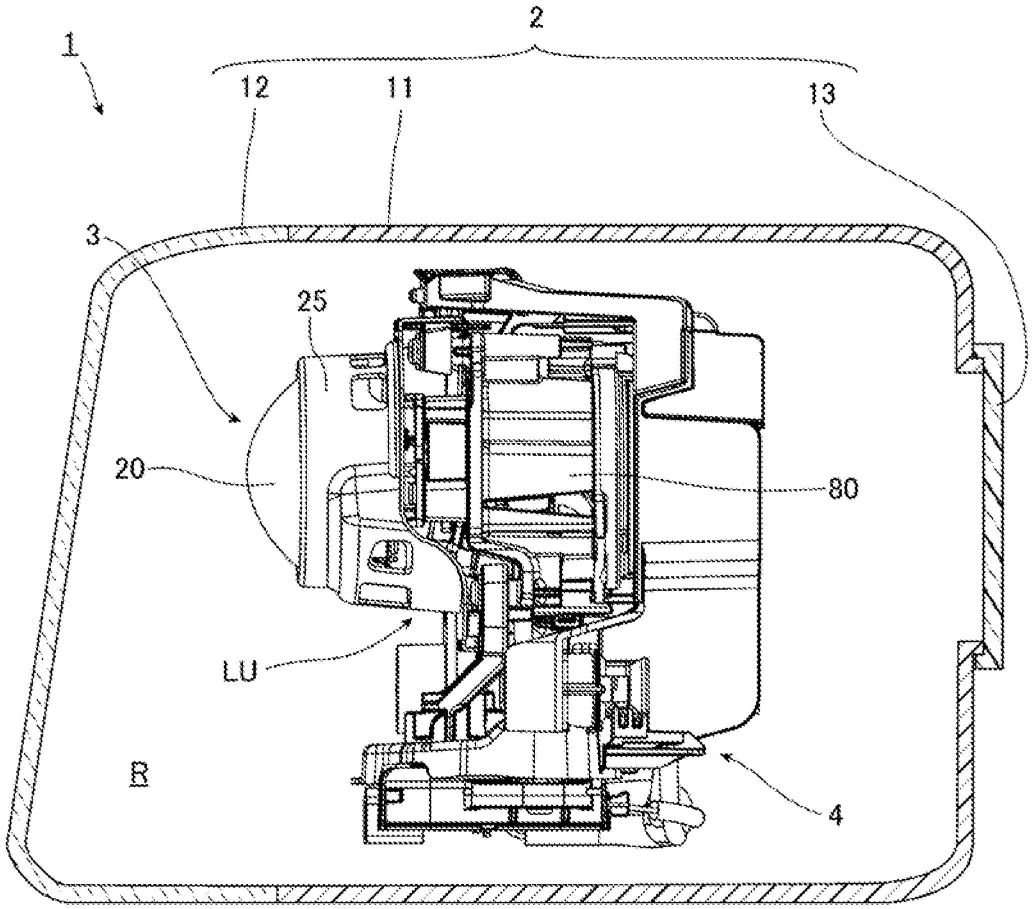
FIG. 1 is a diagram illustrating a vehicular lighting tool including a vehicle-mounted light source unit according to a first embodiment of the present invention.

FIG. 1 is a diagram illustrating a vehicular lighting tool including a vehicle-mounted light source unit according to the present embodiment. In the present embodiment, this vehicular lighting tool is configured as a vehicular headlight 1. The vehicular headlight is generally provided on each of the left side and the right side of the front of the vehicle, and these vehicular headlights have substantially the same configuration except that they are attached to the left side and the right side. Accordingly, only the vehicular headlight on one of the left side and the right side will be described below.

As illustrated in FIG. 1, the vehicular headlight 1 of the present embodiment includes a casing 2, a lighting tool unit 3, and a support unit 4 as main configurations. Note that FIG. 1 is a side diagram of the vehicular headlight 1, and FIG. 1 illustrates the casing 2 in a cross section for easy understanding.

The casing 2 includes a lamp housing 11, a front cover 12, and a back cover 13 as main configurations. An opening is formed on the front side of the lamp housing 11, and the opening on the front side is closed by the translucent front cover 12 fixed to the lamp housing 11. An opening smaller than the opening on the front side is formed on the rear side of the lamp housing 11. The opening on the rear side is closed by the back cover 13 fixed to the lamp housing 11.

A space formed by the lamp housing 11, the front cover 12, and the back cover 13 is a lighting room R. The lighting tool unit 3 and the support unit 4 are accommodated in the lighting room R.

The support unit 4 is attached to the lighting tool unit 3 from the rear side of the lighting tool unit 3 to support the lighting tool unit 3. The support unit 4 is fixed to the casing 2 by a configuration, which is not illustrated. Accordingly, the lighting tool unit 3 is fixed to the casing 2 via the support unit 4.

Figure 2:
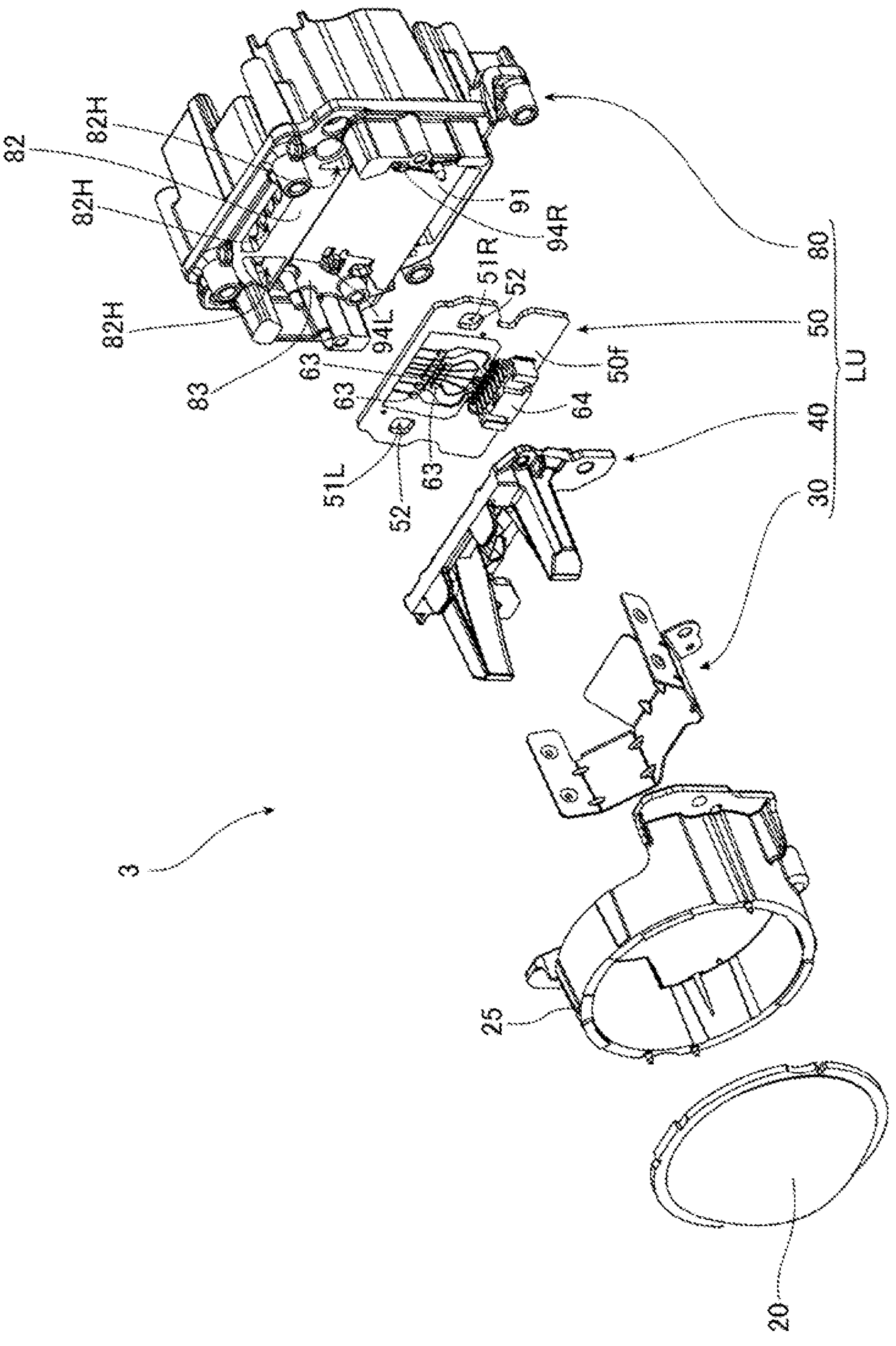
FIG. 2 is an exploded perspective diagram illustrating the vehicle-mounted light source unit illustrated in FIG. 1.

FIG. 2 is an exploded perspective diagram of the lighting tool unit 3 illustrated in FIG. 1. As illustrated in FIG. 2, the lighting tool unit 3 of the present embodiment includes a projection lens 20, a lens holder 25, and a vehicle-mounted light source unit LU as main configurations.

The vehicle-mounted light source unit LU of the present embodiment includes a support plate 30, a reflector unit 40, a substrate 50, and a heat sink 80 as main configurations.

Figure 3:
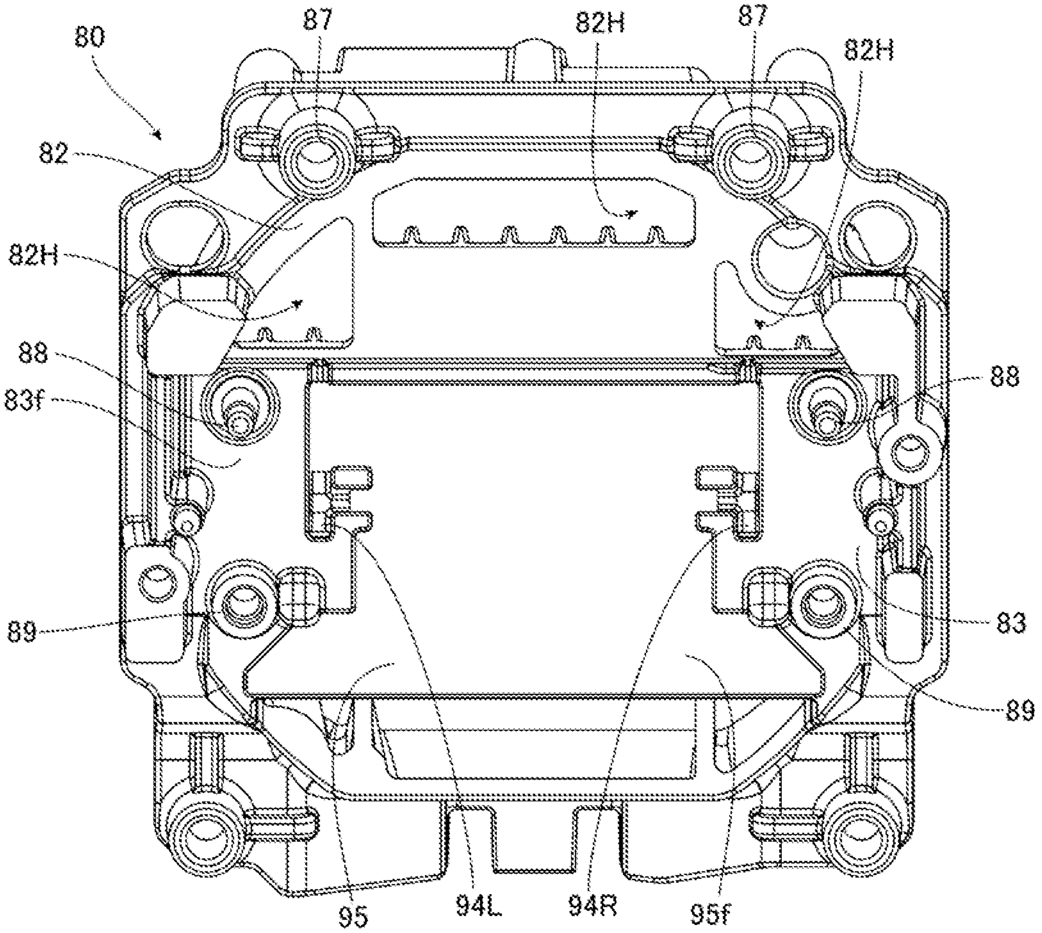
FIG. 3 is a front diagram of a heat sink of the vehicle-mounted light source unit as viewed along a height direction of ribs.

The heat sink 80 is formed of a material having excellent heat dissipation, and is formed of, for example, metal. FIG. 3 is a front diagram of the heat sink 80 as viewed along the height direction of ribs to be described below, and illustrates a state in which the heat sink 80 is viewed from the front side. As illustrated in FIG. 3, the heat sink 80 of the present embodiment is formed in a substantially square shape in front view, and includes a ventilation portion 82 located slightly above the center of the heat sink 80 in the up-down direction and a substrate mounting portion 83 located below the ventilation portion 82.

As illustrated in FIGS. 2 and 3, a plurality of ventilation holes 82H penetrating in a front-rear direction is formed in the ventilation portion 82. A fan, which is not illustrated, is mounted on the rear side of the heat sink 80, and the fan blows air to the front surface side of the heat sink 80 through the ventilation holes 82H.

In addition, bosses 87 extending forward are erected in the vicinity of the left end and the vicinity of the right end of the upper edge of the ventilation portion 82.

A front surface 83*f* of the substrate mounting portion 83 is an inclined surface that projects forward from the upper side to the lower side. The upper edge of the substrate mounting portion 83 is connected to the lower edge of the ventilation portion 82. In the present embodiment, bosses 88, bosses 89, a pedestal 95, a first rib 94L and a second rib 94R, which are a pair of ribs, and the like are provided on the front surface 83*f* of the substrate mounting portion 83.

The bosses 88 are provided in the vicinity of the left end and the vicinity of the right end of the upper edge of the substrate mounting portion 83, and these bosses 88 extend forward. In addition, the bosses 89 are provided substantially immediately below the respective bosses 88 and extend forward.

The pedestal 95 is a portion protruding forward from the front surface 83*f* of the substrate mounting portion 83, and has a substantially line-symmetric outer shape with respect to a line passing through the center in the left-right direction of the heat sink 80 and extending along the up-down direction. A front surface 95*f* of the pedestal 95 is substantially parallel to the front surface 83*f* of the substrate mounting portion 83. At least a part of the substrate 50 is placed on the front surface 95*f* of the pedestal 95.

The first rib 94L and the second rib 94R protrude to the front side from the front surface 83*f* of the substrate mounting portion 83. Note that the height direction of each of the first rib 94L and the second rib 94R is perpendicular to the left-right direction. The first rib 94L is provided on the left side, which is one side with reference to the line passing through the center in the left-right direction of the heat sink 80 and extending along the up-down direction, and the second rib 94R is provided on the right side, which is the other side with reference to the above-described line. In the present embodiment, the first rib 94L and the second rib 94R are provided at the same position in the up-down direction. As described above, in the present embodiment, the first rib 94L and the second rib 94R are arranged along the left-right direction. In addition, the first rib 94L and the second rib 94R are located between the bosses 88 and the bosses 89 described above in the up-down direction. In addition, the first rib 94L is located substantially immediately below the left boss 87 of the pair of bosses 87 described above, and the second rib 94R is located substantially immediately below the right boss 87.

Figure 4:
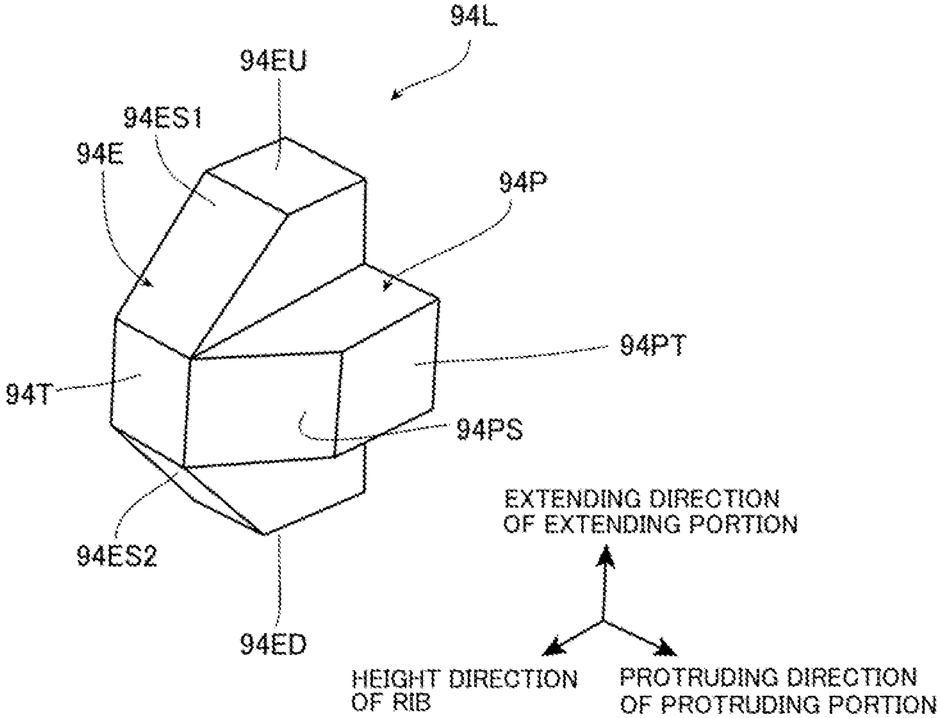
FIG. 4 is a perspective diagram schematically illustrating a first rib provided on the heat sink.

FIG. 4 is an enlarged perspective diagram illustrating the first rib 94L illustrated in FIG. 2. As illustrated in FIG. 4, the first rib 94L includes an extending portion 94E and a protruding portion 94P, and the extending portion 94E and the protruding portion 94P protrude to the front side from the front surface 83*f* of the substrate mounting portion 83, and this protruding direction is the height direction of the first rib 94L. The extending portion 94E extends along a direction perpendicular to both the height direction and the left-right direction of the rib. Accordingly, when viewed along the height direction of the rib, the extending portion 94E extends in a direction different from the direction in which the first rib 94L and the second rib 94R are arranged. In the present embodiment, the extending direction of the extending portion 94E is substantially parallel to the up-down direction. Note that the length of the extending portion 94E in the extending direction is longer than the length of the extending portion 94E in the left-right direction. When viewed along the height direction of the rib, the protruding portion 94P protrudes rightward from the central portion of the extending portion 94E in the extending direction, and in the present embodiment, the length of the protruding portion 94P in the protruding direction is shorter than the length of the protruding portion 94P along the above-described extending direction. However, the length of the protruding portion 94P in the protruding direction may be the same as or shorter than the length of the protruding portion 94P along the above-described extending direction.

The center of the extending portion 94E in the extending direction is a top surface 94T of the first rib 94L, and the top surface 94T is a surface of the first rib 94L located on the foremost side. The extending portion 94E includes the top surface 94T, a first inclined surface 94ES1, a second inclined surface 94ES2, an upper end surface 94EU, and a lower end surface 94ED. The first inclined surface 94ES1 is a surface gradually inclined rearward from the upper end of the top surface 94T toward the upper side. The second inclined surface 94ES2 is a surface gradually inclined rearward from the lower end of the top surface 94T toward the lower side. The upper end surface 94EU is a planar surface connected to the upper end of the first inclined surface 94ES1 and parallel to both the height direction and the left-right direction of the rib. The lower end surface 94ED is a planar surface connected to the lower end of the second inclined surface 94ES2 and parallel to both the height direction and the left-right direction of the rib. Note that the planar surface includes a surface curved to an extent that can occur in manufacturing together with a plane.

The protruding portion 94P includes an inclined surface 94PS and an end surface 94PT. The inclined surface 94PS is a surface inclined rearward from the right end of the top surface 94T toward the right side. The end surface 94PT is a planar surface connected to the right end of the inclined surface 94PS and parallel to both the height direction of the rib and the extending direction of the extending portion 94E. Accordingly, the end surface 94PT of the protruding portion 94P has an in-plane direction different from that of the upper end surface 94EU and the lower end surface 94ED of the extending portion 94E.

Note that the second rib 94R has the same configuration as the first rib 94L except that the protruding portion 94P protrudes to the left side.

As illustrated in FIG. 2, the substrate 50 is a plate-like member made of metal, for example. The substrate 50 has a substantially line-symmetric outer shape with respect to a line passing through the center in the left-right direction of the substrate 50 and extending along the up-down direction. In the substrate 50, a first through-hole 51L and a second through-hole 51R penetrating the substrate are formed.

In the present embodiment, the first through-hole 51L and the second through-hole 51R have the same dimension and the same outer shape, which is a substantially square, and R formed when hole machining is performed on the substrate exists at four corners of each of the first through-hole 51L and the second through-hole 51R. The first through-hole 51L is located in the vicinity of a left edge portion, which is one side with reference to a line passing through the center of the substrate 50 in the left-right direction and extending along the up-down direction, and the second through-hole 51R is located in the vicinity of a right edge portion, which is the other side with reference to the above-described line. In the present embodiment, the first through-hole 51L and the second through-hole 51R are provided at the same position in the up-down direction.

In the present embodiment, when the first rib 94L is inserted into the first through-hole 51L, a part of the first rib 94L abuts on an inner wall 52 of the substrate 50 that defines the first through-hole 51L. Thus, the first rib 94L is fitted into the first through-hole 51L. In addition, when the second rib 94R is inserted into the second through-hole 51R, a part of the second rib 94R abuts on an inner wall 52 of the substrate 50 that defines the second through-hole 51R. Thus, the second rib 94R is fitted into the second through-hole 51R. As a result, the substrate 50 is held by the heat sink 80 in a state where the substrate 50 is disposed on the heat sink 80. As described above, in the present embodiment, the first through-hole 51L and the second through-hole 51R function as fitting portions into which the ribs are fitted, and the heat sink 80 functions as a holding member that holds the substrate 50. Note that, in the present embodiment, the in-plane direction of the inner wall 52 of the substrate 50 is substantially parallel to the height direction of the first rib 94L and the second rib 94R.

Figure 5:
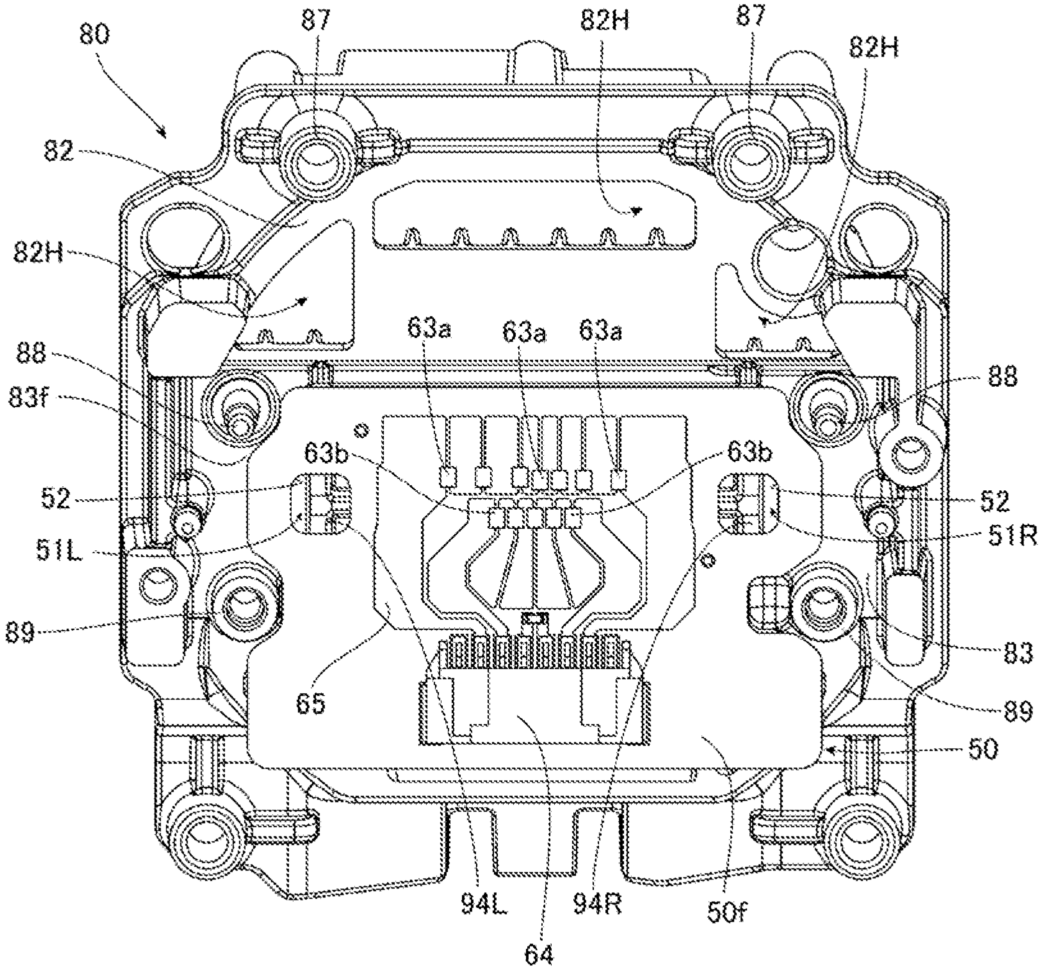
FIG. 5 is a front diagram of a state in which a substrate is held by the heat sink as viewed along the height direction of the ribs.

FIG. 5 is a front diagram of a state in which the substrate 50 is disposed on the heat sink 80 and is held by the heat sink 80 as viewed along the height direction of the ribs. As illustrated in FIG. 5, a plurality of light sources 63*a* and a plurality of light sources 63*b* are mounted on a front surface 50*f* of the substrate 50. These light sources 63*a* and 63*b* may be, for example, light emitting diodes (LEDs). The plurality of light sources 63*a* and 63*b* are arranged in two upper and lower stages along the left-right direction in a region between the first through-hole 51L and the second through-hole 51R in the left-right direction. The light sources 63*a* are arranged at the upper stage, and emit light forming a low beam, for example. On the other hand, the light sources 63*b* are arranged at the lower stage, and emit light forming a high beam, for example. In addition, a connector 64 connected to external power is mounted immediately below the plurality of light sources 63*a* and 63*b* on the front surface 50*f* of the substrate 50, and the connector 64 and the plurality of light sources 63*a* and 63*b* are electrically connected via a power supply circuit 65. Accordingly, when power is supplied to the connector 64, the plurality of light sources 63*a* and 63*b* emit light. Note that in the extending direction of the extending portion 94E of each of the first rib 94L and the second rib 94R, the protruding portion 94P of each of the first rib 94L and the second rib 94R is located between the row of the light sources 63*a* and the row of the light sources 63*b*.

As illustrated in FIG. 2, the reflector unit 40 is fixed to the heat sink 80 via, for example, a screw or the like in a state where the substrate 50 is pinched between the reflector unit 40 and the heat sink 80. On the reflector unit 40, a reflector, a shade, or the like that reflects the light emitted from the plurality of light sources 63*a* and 63*b* and guides the light to the projection lens 20 is mounted. The light emitted from the plurality of light sources 63*a* and 63*b* is, for example, light forming a low beam or a high beam via the reflector, the shade, and the projection lens 20.

The support plate 30 is a member obtained by bending a metal plate-like member having elasticity. The support plate 30 covers the connector 64 and the like described above mounted on the substrate 50 in a state of being fixed to the heat sink 80. Accordingly, even when the vehicular headlight 1 is exposed to sunlight, the connector 64 and the like are shielded by the support plate 30, and the connector 64 and the like are suppressed from being damaged by sunlight.

The lens holder 25 is a substantially cylindrical member extending in the front-rear direction. The lens holder 25 is fixed to the heat sink 80 so as to pinch the substrate 50, the reflector unit 40, the support plate 30, and the like with respect to the heat sink 80. The projection lens 20 is fixed to the front end of the lens holder 25, and an opening on the front side of the lens holder 25 is closed by the projection lens 20.

Next, the relationship between the first rib 94L and the second rib 94R of the heat sink 80 described above and the first through-hole 51L and the second through-hole 51R of the substrate 50 described above will be described in detail.

Figure 6:
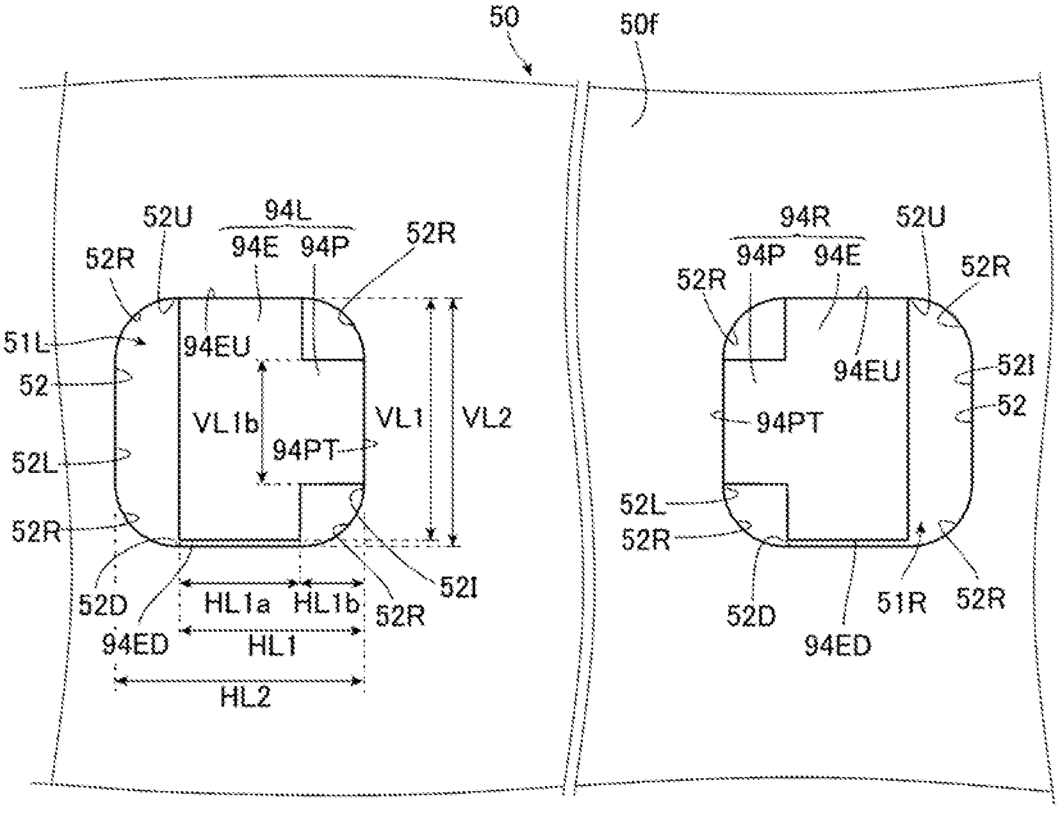
FIG. 6 is an enlarged front diagram schematically illustrating a state of the ribs illustrated in FIG. 5 and the vicinity thereof.

FIG. 6 is a front diagram of a state of the ribs and the vicinity thereof illustrated in FIG. 5 as viewed along the height direction of the ribs, and schematically illustrates the ribs and the vicinity thereof in an enlarged manner. As illustrated in FIG. 6, each of the inner wall 52 of the substrate 50 defining the first through-hole 51L and the inner wall 52 of the substrate 50 defining the second through-hole 51R includes an R portion 52R formed at the four corners, an upper straight portion 52U in the extending direction of the extending portion 94E described above, a lower straight portion 52D in the extending direction, a left straight portion 52L, and a right straight portion 52I. Each of the straight portions 52U and 52D extends along the left-right direction, and each of the straight portions 52L and 52I extends along the extending direction of the extending portion 94E described above.

In addition, as illustrated in FIG. 6, each of the first rib 94L and the second rib 94R has a T-shaped outer shape and the same dimension when viewed along the height direction of these ribs. In addition, the cross-sectional shape of the first rib 94L and the second rib 94R in a plane that passes through the upper end surface 94EU and the lower end surface 94ED, which are both end surfaces of the extending portion 94E in the extending direction of the extending portion 94E, and the end surface 94PT of the protruding portion 94P, and is perpendicular to the height direction of the rib is the same in the height direction of the rib. In addition, the extending portion 94E and the protruding portion 94P of each of the first rib 94L and the second rib 94R have a rectangular shape when viewed along the height direction of the rib.

In each of the first rib 94L and the second rib 94R, a length VL1 along the extending direction of the extending portion 94E is substantially the same as an entire length VL2 of each of the first through-hole 51L and the second through-hole 51R along the above-described extending direction. For example, the length VL1 of the extending portion 94E along the extending direction may be a length shorter than the entire length VL2 of the through-holes 51L and 51R by about 5/100 or less. In addition, a length HL1*a* of the extending portion 94E along the left-right direction is shorter than a length HL2 of each of the first through-hole 51L and the second through-hole 51R along the left-right direction. In the present embodiment, the length HL1*a* of the extending portion 94E along the left-right direction is substantially equal to the length of each of the straight portions 52U and 52D of the inner wall 52 along the left-right direction. For this reason, in the present embodiment, in each of the first rib 94L and the second rib 94R, the upper end surface 94EU of the extending portion 94E faces the straight portion 52U of the inner wall 52 and is substantially in surface contact with the straight portion 52U along the left-right direction, and does not abut on the R portions 52R of the inner wall 52. In addition, in each of the first rib 94L and the second rib 94R, the lower end surface 94ED of the extending portion 94E faces the straight portion 52D of the inner wall 52. As described above, the inner walls 52 defining the first through-hole 51L and the second through-hole 51R, which are fitting portions, include the straight portions 52U and 52D, which are a pair of first facing portions facing both end surfaces of the extending portions 94E.

The protruding portion 94P of the first rib 94L protrudes rightward with reference to the extending portion 94E of the first rib 94L, and the protruding portion 94P of the second rib 94R protrudes leftward with reference to the extending portion 94E of the second rib 94R. As described above, in the present embodiment, the protruding portions 94P of both the first rib 94L and the second rib 94R protrude to the side on which the first rib 94L and the second rib 94R approach each other. In the present embodiment, when viewed along the height direction of the ribs, in each of the first rib 94L and the second rib 94R, the center of the protruding portion 94P in the extending direction of the extending portion 94E and the center of the extending portion 94E in the extending direction are located on the same line extending along the left-right direction. In addition, in each of the first rib 94L and the second rib 94R, a length HL1*b* of the protruding portion 94P along the left-right direction is substantially equal to the radius of the R portions 52R of the inner wall 52.

In the first rib 94L, a length VL1*b* of the protruding portion 94P along the extending direction of the extending portion 94E is substantially equal to the length of the straight portion 52I of the inner wall 52 along the above-described extending direction. In the present embodiment, the end surface 94PT of the protruding portion 94P of the first rib 94L faces the straight portion 52I of the inner wall 52 and is substantially in surface contact along the extending direction of the extending portion 94E, and does not abut on the R portions 52R of the inner wall 52. As described above, the inner wall 52 defining the first through-hole 51L, which is a fitting portion, includes the straight portion 52I, which is a second facing portion facing the end surface 94PT of the protruding portion 94P of the first rib 94L. In addition, when viewed along the height direction of the rib, the position of the end surface 94PT of the protruding portion 94P in the extending direction of the extending portion 94E is between the upper end surface 94EU and the lower end surface 94ED of the extending portion 94E.

In the second rib 94R, a length VL1*b* of the protruding portion 94P along the above-described extending direction is substantially equal to the length of the straight portion 52L of the inner wall 52 along the above-described extending direction. In the present embodiment, the end surface 94PT of the second rib 94R faces the straight portion 52L of the inner wall 52 and is substantially in surface contact with the straight portion 52L along the extending direction of the extending portion 94E, and does not abut on the R portions 52R of the inner wall 52. As described above, the inner wall 52 defining the second through-hole 51R, which is a fitting portion, includes the straight portion 52L, which is a second facing portion facing the end surface 94PT of the protruding portion 94P of the second rib 94R. In addition, when viewed along the height direction of the rib, the position of the end surface 94PT of the protruding portion 94P in the extending direction of the extending portion 94E is between the upper end surface 94EU and the lower end surface 94ED of the extending portion 94E.

As illustrated in FIG. 6, an entire length HL1 of each of the first rib 94L and the second rib 94R along the left-right direction is a sum of the length HL1*a* of the extending portion 94E along the left-right direction and the length HL1*b* of the protruding portion 94P along the left-right direction. Accordingly, the length HL1*a* of the upper end surface 94EU and the lower end surface 94ED of the extending portion 94E along the left-right direction is shorter than the length HL1 of the rib along the left-right direction. In addition, the entire length of each of the first rib 94L and the second rib 94R along the above-described extending direction is equal to the length VL1 of the extending portion 94E along the above-described extending direction. Accordingly, the length VL1*b* of the end surface 94PT of the protruding portion 94P along the above-described extending direction is shorter than the length of the rib along the above-described extending direction.

As described above, the vehicle-mounted light source unit LU of the present embodiment includes the heat sink 80, which is a holding member, including the first rib 94L and the second rib 94R, which are a pair of ribs, and the substrate 50 disposed on the heat sink 80, including the first through-hole 51L and the second through-hole 51R, which are a pair of fitting portions, into which the first rib 94L and the second rib 94R are fitted, and on which the light sources 63*a* and 63*b* are mounted. Each of the first rib 94L and the second rib 94R includes the extending portion 94E and the protruding portion 94P. When viewed along the height direction of each of the first rib 94L and the second rib 94R, the extending portions 94E of the first rib 94L and the second rib 94R extend in a direction different from the direction in which the first rib 94L and the second rib 94R are arranged, and the upper end surface 94EU and the lower end surface 94ED, which are both end surfaces in the extending direction, have a planar shape. In addition, when viewed as described above, the protruding portions 94P of the first rib 94L and the second rib 94R protrude from a part of the extending portions 94E to the side on which the first rib 94L and the second rib 94R approach each other in a direction different from the extending direction of the extending portion 94E, and the end surfaces 94PT in the protruding direction have a planar shape having an in-plane direction different from that of the upper end surface 94EU and the lower end surface 94ED of the extending portion 94E. In addition, each of the first through-hole 51L and the second through-hole 51R, which are fitting portions, includes the pair of first facing portions facing the upper end surface 94EU and the lower end surface 94ED of the extending portion 94E, and the second facing portion facing the end surface 94PT of the protruding portion 94P.

With the vehicle-mounted light source unit LU of the present embodiment, when viewed along the height direction of each of the first rib 94L and the second rib 94R, each of the first rib 94L and the second rib 94R includes the protruding portion 94P protruding to the side where the first rib 94L and the second rib 94R approach each other in the left-right direction, and each of the inner walls 52 defining the first through-hole 51L and the second through-hole 51R, which are fitting portions, includes the second facing portion facing the end surface 94PT of the protruding portion 94P. Accordingly, when the substrate 50 moves leftward with respect to the heat sink 80, the leftward movement of the substrate 50 with respect to the heat sink 80 is restricted by the abutment between the end surface 94PT of the protruding portion 94P of the first rib 94L and the straight portion 52I, which is a second facing portion, of the inner wall 52 defining the first through-hole 51L. On the other hand, when the substrate 50 moves rightward with respect to the heat sink 80, the rightward movement of the substrate 50 with respect to the heat sink 80 is restricted by the abutment between the end surface 94PT of the protruding portion 94P of the second rib 94R and the straight portion 52L, which is a second facing portion, of the inner wall 52 defining the second through-hole 51R. In this way, the substrate 50 is positioned with respect to the heat sink 80 in the left-right direction.

In addition, with the vehicle-mounted light source unit LU of the present embodiment, when viewed along the height direction of each of the first rib 94L and the second rib 94R, each of the first rib 94L and the second rib 94R includes the extending portion 94E extending in a direction different from the left-right direction, and each of the inner walls 52 defining the first through-hole 51L and the second through-hole 51R includes the straight portions 52U and 52D, which are a pair of first facing portions, facing the upper end surface 94EU and the lower end surface 94ED of the extending portion 94E. In addition, the in-plane direction of each of the upper end surface 94EU and the lower end surface 94ED of the extending portion 94E is parallel to both the left-right direction and the height direction of the rib, and thus is different from the in-plane direction of the end surface 94PT of the protruding portion 94P parallel to both the extending direction of the extending portion 94E and the height direction of the rib. Accordingly, when the substrate 50 moves with respect to the heat sink 80 along the above-described extending direction perpendicular to both the left-right direction and the height direction of the rib, the substrate 50 is restricted from moving with respect to the heat sink 80 along the direction perpendicular to both the left-right direction and the height direction of the rib by the abutment between the upper end surface 94EU of the extending portion 94E and the straight portion 52U or the abutment between the lower end surface 94ED of the extending portion 94E and the straight portion 52I. In this way, the substrate 50 is positioned with respect to the heat sink 80 in the direction perpendicular to both the left-right direction and the height direction of the rib. Note that, in the present embodiment, the direction perpendicular to both the left-right direction and the height direction of the rib is substantially parallel to the up-down direction. Accordingly, with the vehicle-mounted light source unit LU, the substrate 50 is restricted from moving in the up-down direction with respect to the heat sink 80 by the abutment between the upper end surface 94EU of the extending portion 94E and the straight portion 52U or the abutment between the lower end surface 94ED of the extending portion 94E and the straight portion 52I, and the substrate 50 is positioned with respect to the heat sink 80 in the up-down direction.

In addition, with the vehicle-mounted light source unit LU of the present embodiment, the upper end surface 94EU of the extending portion 94E is substantially in surface contact with the straight portion 52U of the inner wall 52, the lower end surface 94ED of the extending portion 94E is substantially in surface contact with the straight portion 52D of the inner wall 52, and the end surface 94PT of the protruding portion 94P is substantially in surface contact with the straight portion 52I, 52L of the inner wall 52. Accordingly, for example, unlike the case where the rib has a columnar shape, it is possible to suppress line contact between the rib and the fitting portion and to suppress stress concentration on the abutment portion. Accordingly, deformation of the ribs and the substrate 50 starting from the abutment portion can be suppressed, and a decrease in positioning accuracy between the substrate 50 and the heat sink 80, which is a holding member, can be suppressed.

In addition, with the vehicle-mounted light source unit LU of the present embodiment, the rib has the configuration in which the protruding portion 94P is added to the extending portion 94E. For this reason, in order to perform positioning with the rib in both the left-right direction and the direction perpendicular to the left-right direction, for example, the rib can be enlarged and the rigidity of the rib can be secured as compared with the case where the rectangular rib is generally reduced and brought into abutment with the through-hole. Hence, deformation of the ribs can be suppressed, and a decrease in positioning accuracy can be suppressed.

In addition, with the vehicle-mounted light source unit LU of the present embodiment, since the upper end surface 94EU and the lower end surface 94ED of the extending portion 94E abut on the inner wall 52 of the substrate 50, the abutment area between the rib and the inner wall 52 in the extending direction can be reduced as compared with the case where the entire end surface of the rib in the extending direction of the extending portion 94E abuts on the inner wall 52. Further, with the vehicle-mounted light source unit LU, since the end surface 94PT of the protruding portion 94P protruding from a part of the extending portion 94E abuts on the inner wall 52, the abutment area between the rib and the inner wall 52 in the left-right direction can be reduced as compared with the case where the entire side surface of the rib in the left-right direction abuts on the inner wall 52. As described above, with the vehicle-mounted light source unit LU, since the abutment area between the rib and the inner wall 52 can be reduced as compared with the case where the entire side surface of the rib in the left-right direction abuts on the inner wall 52, it is hardly affected by the accuracy of surface machining, and it is possible to suppress the optical axis misalignment of the light emitted from the light sources 63*a* and 63*b*.

As described above, with the vehicle-mounted light source unit LU of the present embodiment, it is possible to suppress a decrease in positioning accuracy between the substrate 50 and the heat sink 80 and to suppress the optical axis misalignment.

In addition, with the vehicle-mounted light source unit LU of the present embodiment, as described above, when viewed along the height direction of the rib, the position of the end surface 94PT of the protruding portion 94P in the extending direction of the extending portion 94E is between the upper end surface 94EU and the lower end surface 94ED of the extending portion 94E. With such a configuration, even when the R portions 52R are formed at the corners of the inner wall 52 of the substrate 50 by a process of forming the through-hole in the substrate 50, the end surface 94PT of the protruding portion 94P can be avoided from abutting on the R portions 52R, and the end surface 94PT of the protruding portion 94P can be easily abutted on the inner wall 52 of the substrate 50.

In addition, with the vehicle-mounted light source unit LU of the present embodiment, as described above, when viewed along the height direction of the rib, the protruding portion 94P extends in the left-right direction perpendicular to the extending direction from the central portion of the extending portion 94E in the extending direction. In this manner, by protruding the protruding portion 94P in the direction perpendicular to the extending direction from the central portion of the extending portion 94E in the extending direction, it is possible to more effectively avoid the protruding portion 94P from abutting on the R portions 52R formed at the corners in the above-described extending direction of the through-hole, which is a fitting portion.

In addition, with the vehicle-mounted light source unit LU of the present embodiment, as described above, when viewed along the height direction of the rib, the protruding portion 94P of the first rib 94L and the protruding portion 94P of the second rib 94R protrude from a part of the extending portions 94E to the side where the first rib 94L and the second rib 94R approach each other. As illustrated in FIG. a large number of wirings such as the power supply circuit connected to the light sources 63*a* and 63*b* tend to be formed in the central portion of the substrate 50. Therefore, in order to avoid such wiring and the like, it is preferable to form the first through-hole 51L and the second through-hole 51R on the side close to the ends of the substrate 50. When the first through-hole 51L and the second through-hole 51R are formed on the side close to the ends of the substrate the length of an inner region of the substrate 50 from the first through-hole 51L to the second through-hole 51R tends to be longer than the length of an outer region of the substrate 50 from the through-holes 51L and 51R to an outer edge of the substrate 50. For this reason, rigidity in the inner region of the substrate 50 tends to be stronger than rigidity in the outer region of the substrate 50. When the respective protruding portions 94P of the first rib 94L and the second rib 94R are made to protrude to the side where the first rib 94L and the second rib 94R approach each other, the end surfaces 94PT of the respective protruding portions 94P can be brought into abutment with the inner region of the substrate 50 having high rigidity. Accordingly, it is possible to suppress deformation and the like of the substrate 50 as compared with the case where the respective protruding portions 94P of the first rib 94L and the second rib 94R protrude to the side on which the first rib 94L and the second rib 94R are away from each other.

Second Embodiment

Next, the second embodiment will be described. The same or equivalent components as those of the first embodiment are designated by the same reference numerals and duplicated description will be omitted unless otherwise specified.

A vehicular headlight of the present embodiment has the same configuration as the vehicular headlight 1 of the first embodiment except that the shapes of a first rib and a second rib in a vehicle-mounted light source unit LU are different from the shapes of the first rib 94L and the second rib 94R of the first embodiment. Therefore, only the relationship between the first rib and the second rib and a first through-hole and a second through-hole of a substrate in the present embodiment will be described below.

Figure 7:
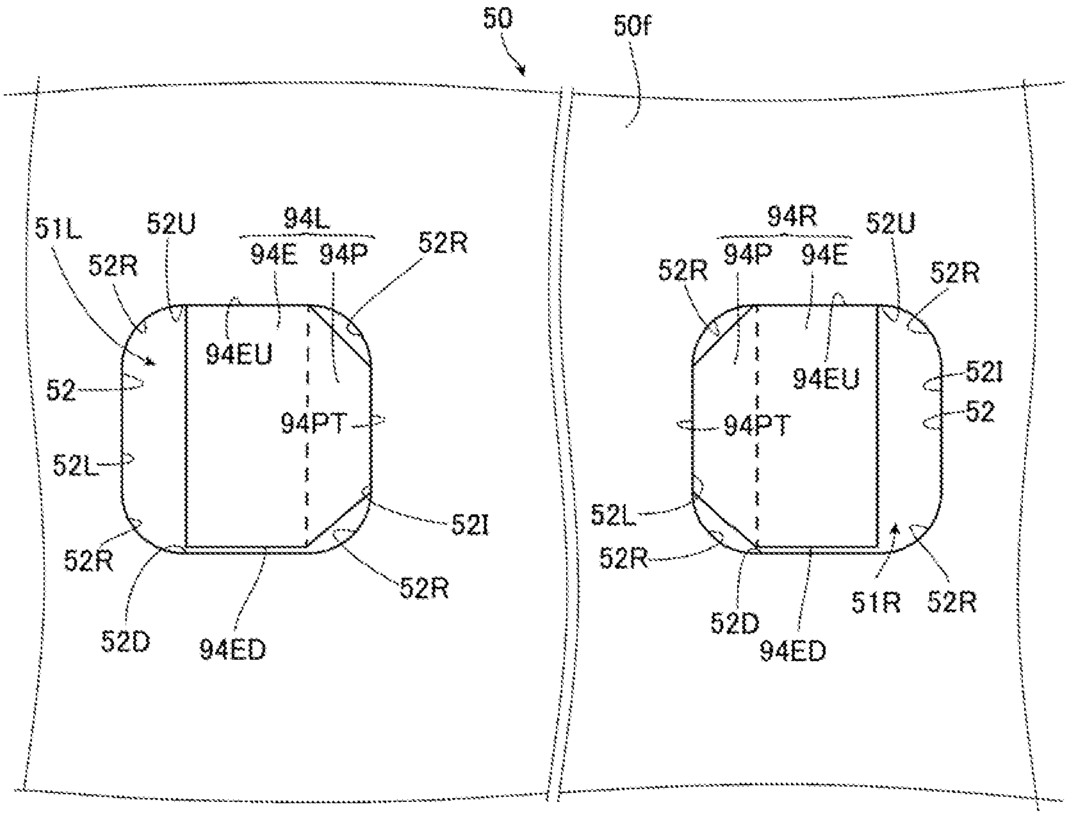
FIG. 7 is a diagram illustrating a part of a vehicle-mounted light source unit according to a second embodiment of the present invention from the same viewpoint as FIG. 6.

FIG. 7 is a diagram illustrating a part of the vehicle-mounted light source unit LU according to the present embodiment from the same viewpoint as FIG. 6. As illustrated in FIG. 7, each of a first rib 94L and a second rib 94R has a symmetrical outer shape and the same dimension when viewed along the height direction of the ribs. Each of the first rib 94L and the second rib 94R includes an extending portion 94E and a protruding portion 94P. The extending portion 94E is a rectangular portion extending substantially along a direction parallel to an up-down direction.

The protruding portion 94P of the first rib 94L is a trapezoidal portion protruding rightward from a part of the extending portion 94E. The lower bottom of the protruding portion 94P of the first rib 94L and the right side portion of the extending portion 94E of the first rib 94L coincide with each other, and the above-described lower bottom and the above-described right side portion are indicated by the broken line in FIG. 7. The protruding portion 94P of the second rib 94R is a trapezoidal portion protruding leftward from a part of the extending portion 94E. The lower bottom of the protruding portion 94P of the second rib 94R and the left side portion of the extending portion 94E of the second rib 94R coincide with each other, and the above-described lower bottom and the above-described left side portion are indicated by the broken line in FIG. 7. As described above, in the present embodiment, the protruding portions 94P of both the first rib 94L and the second rib 94R protrude to the side on which the first rib 94L and the second rib 94R approach each other.

As illustrated in FIG. 7, in the present embodiment, an end surface 94PT, which is an upper bottom of the protruding portion 94P of the first rib 94L, faces a right straight portion 52I of an inner wall 52 defining a first through-hole 51L of the substrate 50 and is substantially in surface contact with the straight portion 52I along the extending direction of the extending portion 94E, and does not abut on R portions 52R of the inner wall 52. For this reason, the position of the end surface 94PT of the protruding portion 94P in the above-described extending direction is between an upper end surface 94EU and a lower end surface 94ED of the extending portion 94E. In addition, an end surface 94PT, which is the upper bottom of the second rib 94R, faces a left straight portion 52L of an inner wall 52 defining a second through-hole 51R of the substrate 50 and is substantially in surface contact with the straight portion 52L along the extending direction of the extending portion 94E, and does not abut on R portions 52R of the inner wall 52. For this reason, the position of the end surface 94PT of the protruding portion 94P in the above-described extending direction is between an upper end surface 94EU and a lower end surface 94ED of the extending portion 94E. As described above, in the present embodiment, the inner walls 52 defining the first through-hole 51L and the second through-hole 51R, which are fitting portions, include the straight portions 52I and 52L, which are second facing portions facing the end surfaces 94PT of the protruding portions 94P.

Note that, in the present embodiment, the extending portion 94E has the same configuration as that of the first embodiment. Accordingly, in each of the first rib 94L and the second rib 94R, a length along the extending direction of the extending portion 94E is substantially the same as an entire length of each of the first through-hole 51L and the second through-hole 51R along the above-described extending direction. In addition, a length of the extending portion 94E along the left-right direction is shorter than a length of each of the first through-hole 51L and the second through-hole 51R along the left-right direction. In the present embodiment, in each of the first rib 94L and the second rib 94R, the upper end surface 94EU of the extending portion 94E faces the straight portion 52U of the inner wall 52 and is substantially in surface contact with the straight portion 52U along the left-right direction, and does not abut on the R portions 52R of the inner wall 52. In addition, in each of the first rib 94L and the second rib 94R, the lower end surface 94ED of the extending portion 94E faces the straight portion 52D of the inner wall 52. As described above, in the present embodiment, the inner walls 52 defining the first through-hole 51L and the second through-hole 51R, which are fitting portions, include the straight portions 52U and 52D, which are a pair of first facing portions facing the upper end surface 94EU and the lower end surface 94ED, which are both end surfaces of the extending portion 94E.

As described above, the vehicle-mounted light source unit LU of the present embodiment includes the heat sink 80, which is a holding member, including the first rib 94L and the second rib 94R, which are a pair of ribs, and the substrate 50 disposed on the heat sink 80, including the first through-hole 51L and the second through-hole 51R, which are a pair of fitting portions, into which the first rib 94L and the second rib 94R are fitted, and on which the light sources 63*a* and 63*b* are mounted. Each of the first rib 94L and the second rib 94R includes the extending portion 94E and the protruding portion 94P. When viewed along the height direction of each of the first rib 94L and the second rib 94R, the extending portions 94E of the first rib 94L and the second rib 94R extend in a direction different from the direction in which the first rib 94L and the second rib 94R are arranged, and the upper end surface 94EU and the lower end surface 94ED, which are both end surfaces in the extending direction, have a planar shape. In addition, when viewed as described above, the protruding portions 94P of the first rib 94L and the second rib 94R protrude from a part of the extending portions 94E to the side on which the first rib 94L and the second rib 94R approach each other in a direction different from the extending direction of the extending portion 94E, and the end surfaces 94PT in the protruding direction have a planar shape having an in-plane direction different from that of the upper end surface 94EU and the lower end surface 94ED of the extending portion 94E. In addition, each of the first through-hole 51L and the second through-hole 51R, which are fitting portions, includes the pair of first facing portions facing the upper end surface 94EU and the lower end surface 94ED of the extending portion 94E, and the second facing portion facing the end surface 94PT of the protruding portion 94P.

Accordingly, with the vehicle-mounted light source unit LU of the present embodiment, as in the first embodiment, it is possible to suppress a decrease in positioning accuracy between the substrate 50 and the heat sink 80 and to suppress the optical axis misalignment.

In addition, with the vehicle-mounted light source unit LU of the present embodiment, as described above, the position of the end surface 94PT of the protruding portion 94P in the extending direction of the extending portion 94E is between the upper end surface 94EU and the lower end surface 94ED of the extending portion 94E. Accordingly, the end surface 94PT of the protruding portion 94P can be avoided from abutting on the R portions 52R of the inner wall 52, and the end surface 94PT of the protruding portion 94P can be easily abutted on the inner wall 52.

In addition, with the vehicle-mounted light source unit LU of the present embodiment, as described above, the protruding portion 94P of the first rib 94L and the protruding portion 94P of the second rib 94R protrude to the side on which the first rib 94L and the second rib 94R approach each other. For this reason, it is possible to suppress deformation and the like of the substrate 50 as compared with the case where the respective protruding portions 94P of the first rib 94L and the second rib 94R protrude to the side on which the first rib 94L and the second rib 94R are away from each other.

Third Embodiment

Next, the third embodiment will be described. The same or equivalent components as those of the first embodiment are designated by the same reference numerals and duplicated description will be omitted unless otherwise specified.

A vehicular headlight of the present embodiment has the same configuration as the vehicular headlight 1 of the first embodiment except that the shapes of a first rib and a second rib in a vehicle-mounted light source unit LU are different from the shapes of the first rib 94L and the second rib 94R of the first embodiment. Therefore, only the relationship between the first rib and the second rib and a first through-hole and a second through-hole of a substrate in the present embodiment will be described below.

Figure 8:
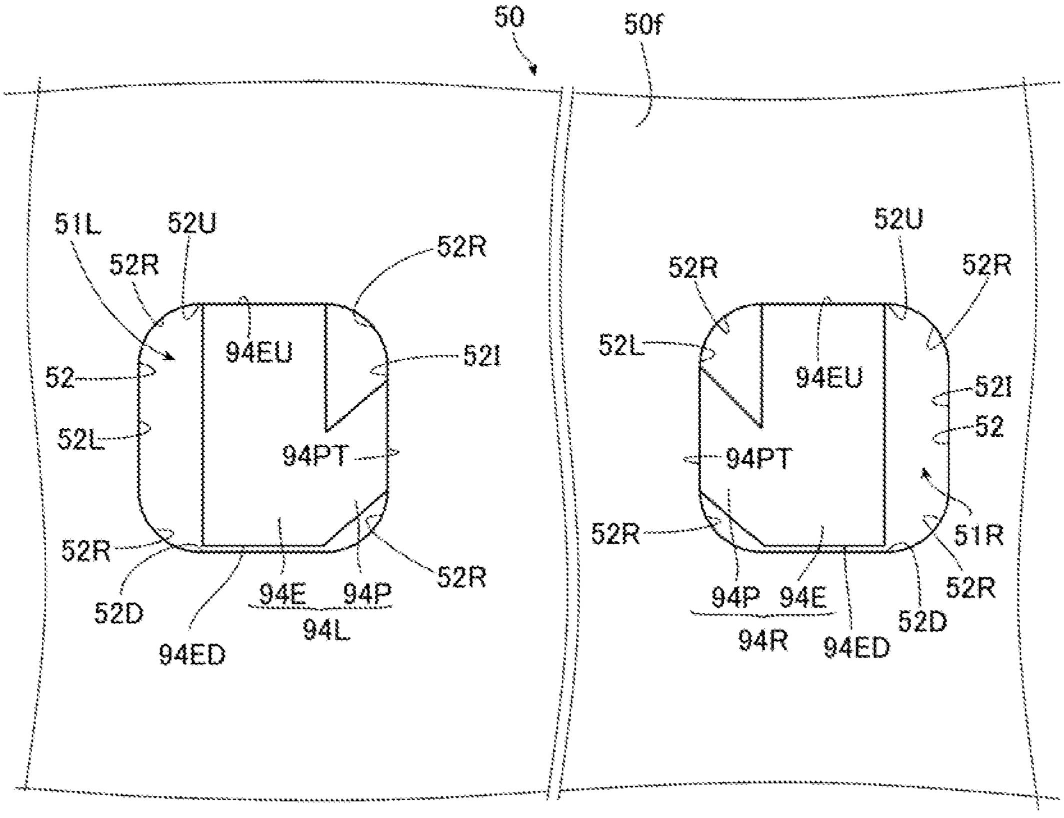
FIG. 8 is a diagram illustrating a part of a vehicle-mounted light source unit according to a third embodiment of the present invention from the same viewpoint as FIG. 6.

FIG. 8 is a diagram illustrating a part of the vehicle-mounted light source unit LU according to the present embodiment from the same viewpoint as FIG. 6. As illustrated in FIG. 8, each of a first rib 94L and a second rib 94R has a symmetrical outer shape and the same dimension when viewed along the height direction of the ribs. Each of the first rib 94L and the second rib 94R includes an extending portion 94E and a protruding portion 94P. The extending portion 94E is a rectangular portion extending substantially along a direction parallel to an up-down direction.

The protruding portion 94P of the first rib 94L is formed in a parallelogram shape protruding rightward and upward from a lower half side of the extending portion 94E with reference to the extending portion 94E. In the present embodiment, the protruding portion 94P of the first rib 94L is inclined at an angle larger than 0° and smaller than 90° with respect to a line extending along the extending direction of the extending portion 94E, and this angle is, for example, 45°. In addition, the protruding portion 94P of the second rib 94R is formed in a parallelogram shape protruding leftward and upward from the extending portion 94E of the second rib 94R with reference to the extending portion 94E. In the present embodiment, the protruding portion 94P of the second rib 94R is inclined at an angle larger than 0° and smaller than 90° with respect to a line extending along the extending direction of the extending portion 94E, and this angle is, for example, 45°. As described above, in the present embodiment, the protruding portions 94P of both the first rib 94L and the second rib 94R protrude to the side on which the first rib 94L and the second rib 94R approach each other in the left-right direction.

As illustrated in FIG. 8, in the present embodiment, when viewed along the height direction of the rib, an end surface 94PT of the protruding portion 94P of the first rib 94L faces a right straight portion 52I of an inner wall 52 defining a first through-hole 51L of the substrate 50 and is substantially in surface contact with the straight portion 52I along the extending direction of the extending portion 94E, and does not abut on R portions 52R of the inner wall 52. For this reason, the position of the end surface 94PT of the protruding portion 94P in the above-described extending direction is between an upper end surface 94EU and a lower end surface 94ED of the extending portion 94E. In addition, when viewed along the height direction of the rib, an end surface 94PT of the second rib 94R faces a left straight portion 52L of an inner wall 52 defining a second through-hole 51R of the substrate 50 and is substantially in surface contact with the straight portion 52L along the extending direction of the extending portion 94E, and does not abut on R portions 52R of the inner wall 52. For this reason, the position of the end surface 94PT of the protruding portion 94P in the above-described extending direction is between an upper end surface 94EU and a lower end surface 94ED of the extending portion 94E. As described above, in the present embodiment, the inner walls 52 defining the first through-hole 51L and the second through-hole 51R, which are fitting portions, include the straight portions 52I and 52L, which are second facing portions facing the end surfaces 94PT of the protruding portions 94P.

Note that, in the present embodiment, the extending portion 94E has the same configuration as that of the first embodiment. Accordingly, in each of the first rib 94L and the second rib 94R, a length along the extending direction of the extending portion 94E is substantially the same as an entire length of each of the first through-hole 51L and the second through-hole 51R along the above-described extending direction. In addition, a length of the extending portion 94E along the left-right direction is shorter than a length of each of the first through-hole 51L and the second through-hole 51R along the left-right direction. In the present embodiment, in each of the first rib 94L and the second rib 94R, the upper end surface 94EU of the extending portion 94E faces the straight portion 52U of the inner wall 52 and is substantially in surface contact with the straight portion 52U along the left-right direction, and does not abut on the R portions 52R of the inner wall 52. In addition, in each of the first rib 94L and the second rib 94R, the lower end surface 94ED of the extending portion 94E faces the straight portion 52D of the inner wall 52. As described above, in the present embodiment, the inner walls 52 defining the first through-hole 51L and the second through-hole 51R, which are fitting portions, include the straight portions 52U and 52D, which are a pair of first facing portions facing both end surfaces of the extending portion 94E.

As described above, the vehicle-mounted light source unit LU of the present embodiment includes the heat sink 80, which is a holding member, including the first rib 94L and the second rib 94R, which are a pair of ribs, and the substrate 50 disposed on the heat sink 80, including the first through-hole 51L and the second through-hole 51R, which are a pair of fitting portions, into which the first rib 94L and the second rib 94R are fitted, and on which the light sources 63*a* and 63*b* are mounted. Each of the first rib 94L and the second rib 94R includes the extending portion 94E and the protruding portion 94P. When viewed along the height direction of each of the first rib 94L and the second rib 94R, the extending portions 94E of the first rib 94L and the second rib 94R extend in a direction different from the direction in which the first rib 94L and the second rib 94R are arranged, and the upper end surface 94EU and the lower end surface 94ED, which are both end surfaces in the extending direction, have a planar shape. In addition, when viewed as described above, the protruding portions 94P of the first rib 94L and the second rib 94R protrude from a part of the extending portions 94E to the side on which the first rib 94L and the second rib 94R approach each other in a direction different from the extending direction of the extending portion 94E, and the end surfaces 94PT in the protruding direction have a planar shape having an in-plane direction different from that of the upper end surface 94EU and the lower end surface 94ED of the extending portion 94E. In addition, each of the first through-hole 51L and the second through-hole 51R, which are fitting portions, includes the pair of first facing portions facing the upper end surface 94EU and the lower end surface 94ED of the extending portion 94E, and the second facing portion facing the end surface 94PT of the protruding portion 94P.

Accordingly, with the vehicle-mounted light source unit LU of the present embodiment, as in the first embodiment, it is possible to suppress a decrease in positioning accuracy between the substrate 50 and the heat sink 80 and to suppress the optical axis misalignment.

In addition, with the vehicle-mounted light source unit LU of the present embodiment, as described above, the position of the end surface 94PT of the protruding portion 94P in the extending direction of the extending portion 94E is between the upper end surface 94EU and the lower end surface 94ED of the extending portion 94E. Accordingly, the end surface 94PT of the protruding portion 94P can be avoided from abutting on the R portions 52R of the inner wall 52, and the end surface 94PT of the protruding portion 94P can be easily abutted on the inner wall 52.

In addition, with the vehicle-mounted light source unit LU of the present embodiment, as described above, the protruding portion 94P of the first rib 94L and the protruding portion 94P of the second rib 94R protrude to the side on which the first rib 94L and the second rib 94R approach each other. For this reason, it is possible to suppress deformation and the like of the substrate 50 as compared with the case where the respective protruding portions 94P of the first rib 94L and the second rib 94R protrude to the side on which the first rib 94L and the second rib 94R are away from each other.

Fourth Embodiment

Next, the fourth embodiment will be described. The same or equivalent components as those of the first embodiment are designated by the same reference numerals and duplicated description will be omitted unless otherwise specified.

A vehicular headlight of the present embodiment has the same configuration as the vehicular headlight 1 of the first embodiment except that the shapes of a first rib and a second rib in a vehicle-mounted light source unit LU are different from the shapes of the first rib 94L and the second rib 94R of the first embodiment. Therefore, only the relationship between the first rib and the second rib and a first through-hole and a second through-hole of a substrate in the present embodiment will be described below.

Figure 9:
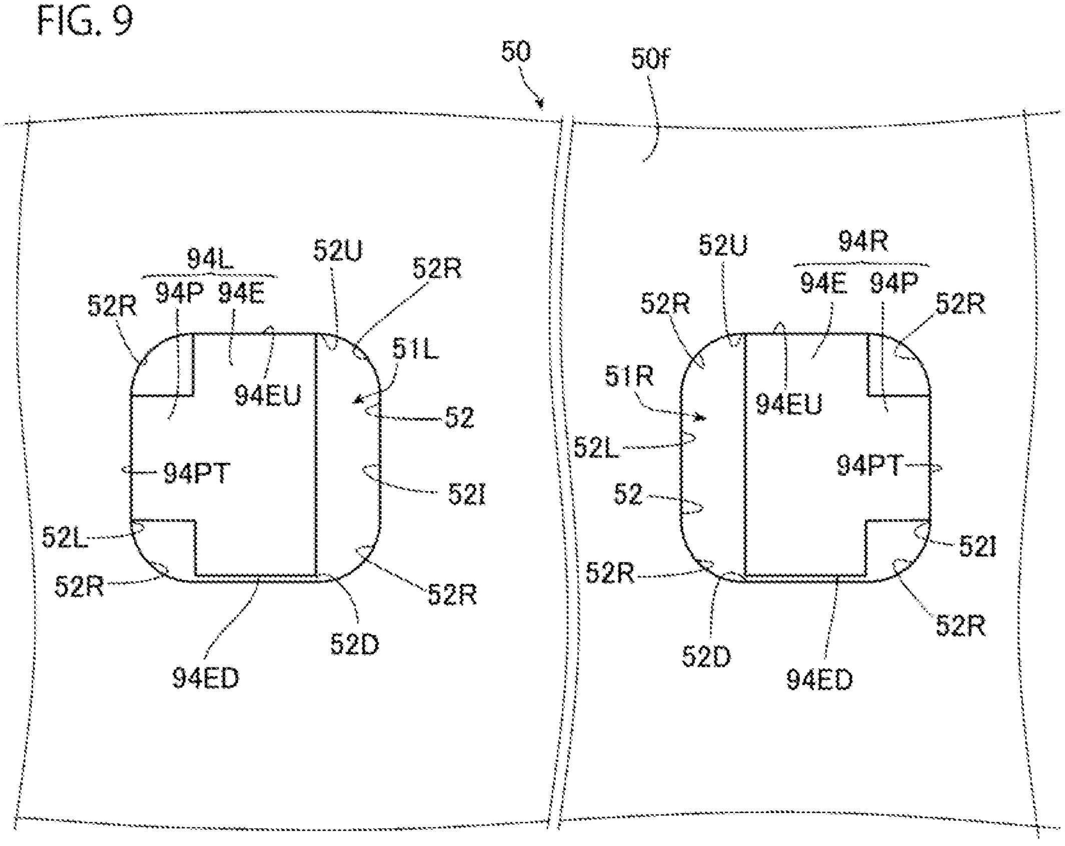
FIG. 9 is a diagram illustrating a part of a vehicle-mounted light source unit according to a fourth embodiment of the present invention from the same viewpoint as FIG. 6.

The vehicle-mounted light source unit LU of the present embodiment is different from the vehicle-mounted light source unit LU of the first embodiment only in that the protruding direction of the protruding portion 94P is different. FIG. 9 is a diagram illustrating a part of the vehicle-mounted light source unit LU according to the present embodiment from the same viewpoint as FIG. 6. As illustrated in FIG. 9, the protruding portion 94P of the first rib 94L of the present embodiment is formed in a rectangular shape protruding leftward from the extending portion 94E of the first rib 94L with reference to the extending portion 94E along the height direction of the rib. In addition, in the present embodiment, the protruding portion 94P of the second rib 94R is formed in a rectangular shape protruding rightward from the extending portion 94E of the second rib 94R with reference to the extending portion 94E when viewed along the height direction of the rib. As described above, in the present embodiment, in the left-right direction perpendicular to the height direction of the rib and different from the extending direction of the extending portion 94E, the protruding portions 94P of both the first rib 94L and the second rib 94R protrude to the side on which the first rib 94L and the second rib 94R are away from each other.

In this manner, in a case where the protruding portions 94P of the first rib 94L and the second rib 94R protrude to the side on which the first rib 94L and the second rib 94R are away from each other, when the substrate 50 moves rightward with respect to the heat sink 80, the rightward movement of the substrate 50 is restricted by the abutment between the end surface 94PT of the protruding portion 94P of the first rib 94L and the straight portion 52L of the inner wall 52 of the substrate 50. In addition, when the substrate 50 moves leftward with respect to the heat sink the leftward movement of the substrate 50 is restricted by the abutment between the end surface 94PT of the protruding portion 94P of the second rib 94R and the straight portion 52I of the inner wall 52 of the substrate 50. In this way, the substrate 50 is positioned in the left-right direction by the protruding portions 94P of the first rib 94L and the second rib 94R.

As described above, the vehicle-mounted light source unit LU of the present embodiment includes the heat sink 80, which is a holding member, including the first rib 94L and the second rib 94R, which are a pair of ribs, and the substrate 50 disposed on the heat sink 80, including the first through-hole 51L and the second through-hole 51R, which are a pair of fitting portions, into which the first rib 94L and the second rib 94R are fitted, and on which the light sources 63*a* and 63*b* are mounted. Each of the first rib 94L and the second rib 94R includes the extending portion 94E and the protruding portion 94P. When viewed along the height direction of each of the first rib 94L and the second rib 94R, the extending portions 94E of the first rib 94L and the second rib 94R extend in a direction different from the direction in which the first rib 94L and the second rib 94R are arranged, and the upper end surface 94EU and the lower end surface 94ED, which are both end surfaces in the extending direction, have a planar shape. In addition, when viewed as described above, the protruding portions 94P of the first rib 94L and the second rib 94R protrude from a part of the extending portions 94E to the side on which the first rib 94L and the second rib 94R are away from each other in a direction different from the extending direction of the extending portion 94E, and the end surfaces 94PT in the protruding direction have a planar shape having an in-plane direction different from that of the upper end surface 94EU and the lower end surface 94ED of the extending portion 94E. In addition, each of the first through-hole 51L and the second through-hole 51R, which are fitting portions, includes the pair of first facing portions facing the upper end surface 94EU and the lower end surface 94ED of the extending portion 94E, and the second facing portion facing the end surface 94PT of the protruding portion 94P.

Accordingly, with the vehicle-mounted light source unit LU of the present embodiment, as in the first embodiment, it is possible to suppress a decrease in positioning accuracy between the substrate 50 and the heat sink 80 and to suppress the optical axis misalignment.

In addition, with the vehicle-mounted light source unit LU of the present embodiment, as described above, the position of the end surface 94PT of the protruding portion 94P in the extending direction of the extending portion 94E is between the upper end surface 94EU and the lower end surface 94ED of the extending portion 94E. Accordingly, the end surface 94PT of the protruding portion 94P can be avoided from abutting on the R portions 52R of the inner wall 52, and the end surface 94PT of the protruding portion 94P can be easily abutted on the inner wall 52.

Fifth Embodiment

Next, the fifth embodiment will be described. The same or equivalent components as those of the first embodiment are designated by the same reference numerals and duplicated description will be omitted unless otherwise specified.

A vehicular headlight of the present embodiment has the same configuration as the vehicular headlight 1 of the first embodiment except that the shapes of a first rib and a second rib in a vehicle-mounted light source unit LU are different from the shapes of the first rib 94L and the second rib 94R of the first embodiment and that the shapes of a first through-hole and a second through-hole are different from the shapes of the first through-hole 51L and the second through-hole 51R of the first embodiment. Therefore, only the relationship between the first rib and the second rib and a first through-hole and a second through-hole of a substrate in the present embodiment will be described below.

Figure 10:
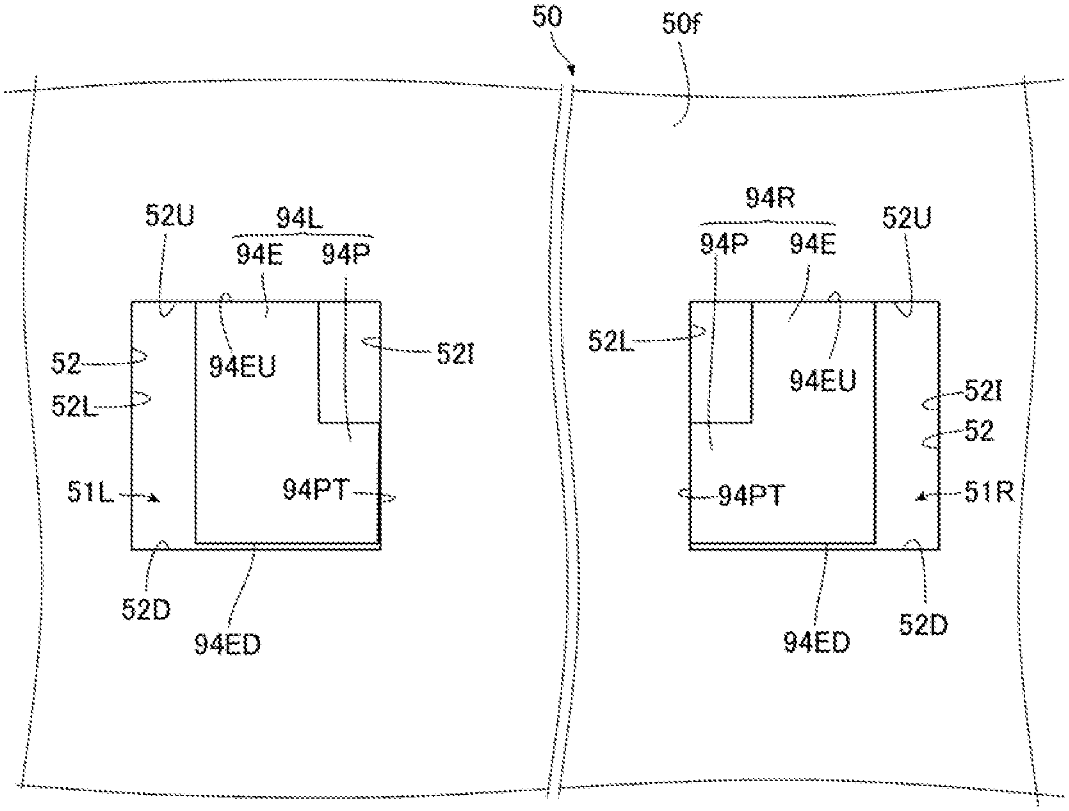
FIG. 10 is a diagram illustrating a part of a vehicle-mounted light source unit according to a fifth embodiment of the present invention from the same viewpoint as FIG. 6.

FIG. 10 is a diagram illustrating a part of the vehicle-mounted light source unit LU according to the present embodiment from the same viewpoint as FIG. 6. As illustrated in FIG. 10, each of the first through-hole 51L and the second through-hole 51R of the present embodiment has the same outer shape and dimension. Each of the first through-hole 51L and the second through-hole 51R is formed in a substantially square shape when viewed along the height direction of the rib, and unlike the first through-hole 51L and the second through-hole 51R of the first embodiment, R portions at the four corners are small to the extent that they cannot be visually recognized. Accordingly, in the present embodiment, it can be considered that the R portion does not exist at the four corners of an inner wall 52.

As illustrated in FIG. 10, in the present embodiment, each of the first rib 94L and the second rib 94R has a symmetrical outer shape and the same dimension when viewed along the height direction of the ribs. Each of the first rib 94L and the second rib 94R includes an extending portion 94E and a protruding portion 94P. The extending portion 94E is a rectangular portion extending substantially along a direction parallel to an up-down direction.

The protruding portion 94P of the first rib 94L is a rectangular portion protruding rightward from a lower half side of the extending portion 94E of the first rib 94L. For this reason, the first rib 94L of the present embodiment is generally formed in an L shape. In addition, when viewed along the height direction of the rib, an end surface 94PT of the protruding portion 94P of the first rib 94L faces a substantially lower half of a right straight portion 52I of an inner wall 52 of a substrate 50 defining a first through-hole 51L and is substantially in surface contact with a substantially lower half of the straight portion 52I along the extending direction of the extending portion 94E, and does not abut on a substantially upper half of the straight portion 52I of the inner wall 52. In addition, the protruding portion 94P of the second rib 94R is a rectangular portion protruding leftward from a lower half side of the extending portion 94E of the second rib 94R. Accordingly, the second rib 94R of the present embodiment is generally formed in an inverted L shape. In addition, when viewed along the height direction of the rib, an end surface 94PT of the protruding portion 94P of the second rib 94R faces a substantially lower half of a left straight portion 52L of an inner wall 52 of the substrate 50 defining a second through-hole 51R and is substantially in surface contact with a substantially lower half of the straight portion 52L along the extending direction of the extending portion 94E, and does not abut on a substantially upper half of the straight portion 52L of the inner wall 52. As described above, in the present embodiment, the inner walls 52 defining the first through-hole 51L and the second through-hole 51R, which are fitting portions, include the straight portions 52I and 52L, which are second facing portions facing the end surfaces 94PT of the protruding portions 94P.

Note that, in the present embodiment, the extending portion 94E has the same configuration as that of the first embodiment. Accordingly, in each of the first rib 94L and the second rib 94R, a length along the extending direction of the extending portion 94E is substantially the same as an entire length of each of the first through-hole 51L and the second through-hole 51R along the above-described extending direction. In addition, a length of the extending portion 94E along the left-right direction is shorter than a length of each of the first through-hole 51L and the second through-hole 51R along the left-right direction. In the present embodiment, in each of the first rib 94L and the second rib 94R, an upper end surface 94EU of the extending portion 94E in the extending direction faces a straight portion 52U of the inner wall 52 and is substantially in surface contact with the straight portion 52U along the left-right direction, and does not abut on the corners of the inner wall 52 and the vicinity thereof. In addition, in each of the first rib 94L and the second rib 94R, the lower end surface 94ED of the extending portion 94E faces the straight portion 52D of the inner wall 52. As described above, in the present embodiment, the inner walls 52 defining the first through-hole 51L and the second through-hole 51R, which are fitting portions, include the straight portions 52U and 52D, which are a pair of first facing portions facing both end surfaces of the extending portion 94E.

As described above, the vehicle-mounted light source unit LU of the present embodiment includes the heat sink 80, which is a holding member, including the first rib 94L and the second rib 94R, which are a pair of ribs, and the substrate 50 disposed on the heat sink 80, including the first through-hole 51L and the second through-hole 51R, which are a pair of fitting portions, into which the first rib 94L and the second rib 94R are fitted, and on which the light sources 63*a* and 63*b* are mounted. Each of the first rib 94L and the second rib 94R includes the extending portion 94E and the protruding portion 94P. When viewed along the height direction of each of the first rib 94L and the second rib 94R, the extending portions 94E of the first rib 94L and the second rib 94R extend in a direction different from the direction in which the first rib 94L and the second rib 94R are arranged, and the upper end surface 94EU and the lower end surface 94ED, which are both end surfaces in the extending direction, have a planar shape. In addition, when viewed as described above, the protruding portions 94P of the first rib 94L and the second rib 94R protrude from a part of the extending portions 94E to the side on which the first rib 94L and the second rib 94R approach each other in a direction different from the extending direction of the extending portion 94E, and the end surfaces 94PT in the protruding direction have a planar shape having an in-plane direction different from that of the upper end surface 94EU and the lower end surface 94ED of the extending portion 94E. In addition, each of the first through-hole 51L and the second through-hole 51R, which are fitting portions, includes the pair of first facing portions facing the upper end surface 94EU and the lower end surface 94ED of the extending portion 94E, and the second facing portion facing the end surface 94PT of the protruding portion 94P.

Accordingly, with the vehicle-mounted light source unit LU of the present embodiment, as in the first embodiment, it is possible to suppress a decrease in positioning accuracy between the substrate 50 and the heat sink 80 and to suppress the optical axis misalignment.

In addition, with the vehicle-mounted light source unit LU of the present embodiment, as described above, the protruding portion 94P of the first rib 94L and the protruding portion 94P of the second rib 94R protrude to the side on which the first rib 94L and the second rib 94R approach each other. For this reason, it is possible to suppress deformation and the like of the substrate 50 as compared with the case where the respective protruding portions 94P of the first rib 94L and the second rib 94R protrude to the side on which the first rib 94L and the second rib 94R are away from each other.

Although the present invention has been described above by taking the above-described embodiments as an example, the present invention is not limited thereto.

For example, the abutment area between the end surface of the extending portion 94E and a first facing portion may be the same as the abutment area between the end surface 94PT of the protruding portion 94P and the second facing portion, and the former may be larger than the latter, and the former may be smaller than the latter. However, when the protruding direction of the protruding portion 94P of each of the first rib 94L and the second rib 94R is parallel to the left-right direction, it may be preferable that the abutment area between the end surface of the extending portion 94E and the first facing portion is larger than the abutment area between the end surface 94PT of the protruding portion 94P and the second facing portion. Since vibration in the up-down direction during traveling of the vehicle tends to be larger than vibration in the left-right direction, the rib is more likely to receive a stronger force in a direction parallel to the up-down direction during traveling of the vehicle. In a case where the protruding direction of the protruding portion 94P is parallel to the left-right direction in a state where the vehicle-mounted light source unit LU is mounted on the vehicle, the above-described extending direction can be considered as a direction substantially parallel to the up-down direction. By making a length HL1*a* along the left-right direction of the upper end surface 94EU abutting on the inner wall 52 in the extending portion 94E longer than a length VL1*b* of the end surface 94PT of the protruding portion 94P along the above-described extending direction, the rigidity of the upper end surface 94EU of the extending portion 94E to which the force due to the vibration in the up-down direction is mainly applied can be made stronger than the rigidity of the end surface 94PT of the protruding portion 94P to which the force due to the vibration in the left-right direction is mainly applied. Hence, deformation of the rib during traveling of the vehicle can be more effectively suppressed.

In addition, the length along the extending direction of the extending portion 94E may be the same as the length along the protruding direction of the protruding portion 94P, the former may be longer than the latter, and the former may be shorter than the latter. However, when the protruding direction of the protruding portion 94P of each of the first rib 94L and the second rib 94R is parallel to the left-right direction, it may be preferable that the length along the extending direction of the extending portion 94E is longer than the length along the protruding direction of the protruding portion 94P. As described above, since vibration in the up-down direction during traveling of the vehicle tends to be larger than vibration in the left-right direction, the rib is more likely to receive a stronger force in a direction parallel to the up-down direction during traveling of the vehicle. Hence, by increasing the length along the extending direction of the extending portion 94E as described above, the rigidity of the extending portion 94E can be increased. For this reason, even when a strong force is applied to the rib in the up-down direction during traveling of the vehicle, deformation of the rib can be more effectively suppressed.

Figure 11:
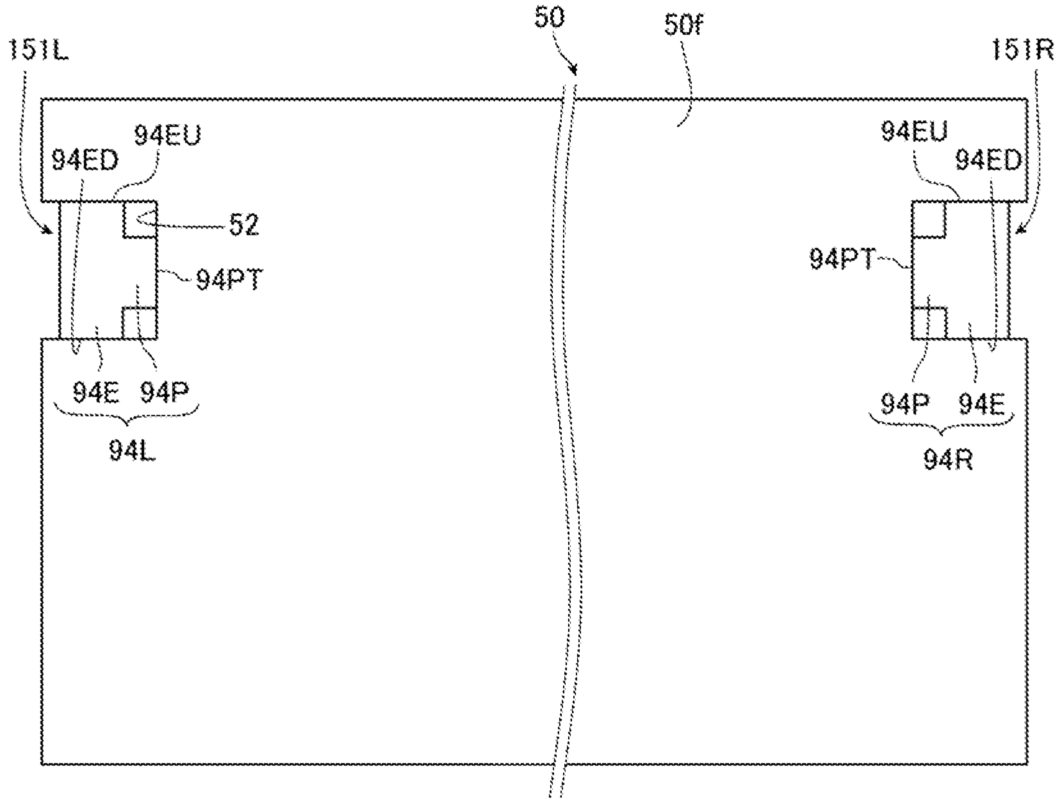
FIG. 11 is a diagram illustrating a part of a vehicle-mounted light source unit according to one modification of the present invention from the same viewpoint as FIG. 6.

In addition, in the above-described embodiments, the example in which each of the pair of fitting portions included in the substrate 50 is a through-hole has been described, but at least one of these fitting portions does not need to be a through-hole. For example, as illustrated in FIG. 11, the fitting portion may be a cutout. In this modification, a first cutout portion 151L formed by cutting from the left end to the right side and a second cutout portion 151R formed by cutting from the right end to the left side are formed in the substrate 50. The first cutout portion 151L and the second cutout portion 151R have the same shape and dimension, and are arranged in the left-right direction. The lengths of the first cutout portion 151L and the second cutout portion 151R in the extending direction of the extending portion 94E are slightly longer than the length of the extending portion 94E of each of the first rib 94L and the second rib 94R in the extending direction. In addition, the upper end surface 94EU of the extending portion 94E faces the upper edge of the inner wall 52 of the substrate defining each of the first cutout portion 151L and the second cutout portion 151R and is substantially in surface contact with the inner wall 52 along the left-right direction. In addition, the lower end surface 94ED of the extending portion 94E faces the lower edge of the inner wall 52 of each of the first cutout portion 151L and the second cutout portion 151R. In addition, the end surface 94PT of the protruding portion 94P of the first rib 94L faces the right end of the inner wall 52 defining the first cutout portion 151L and is substantially in surface contact with the inner wall 52 along the extending direction of the extending portion 94E. In addition, the end surface 94PT of the protruding portion 94P of the second rib 94R faces the left end of the inner wall 52 defining the second cutout portion 151R and is substantially in surface contact with the inner wall 52 along the extending direction of the extending portion 94E. In this way, the first rib 94L and the second rib 94R are fitted into the first cutout portion 151L and the second cutout portion 151R, and the substrate 50 is positioned in the left-right direction and the up-down direction with respect to the heat sink 80.

Figure 12:
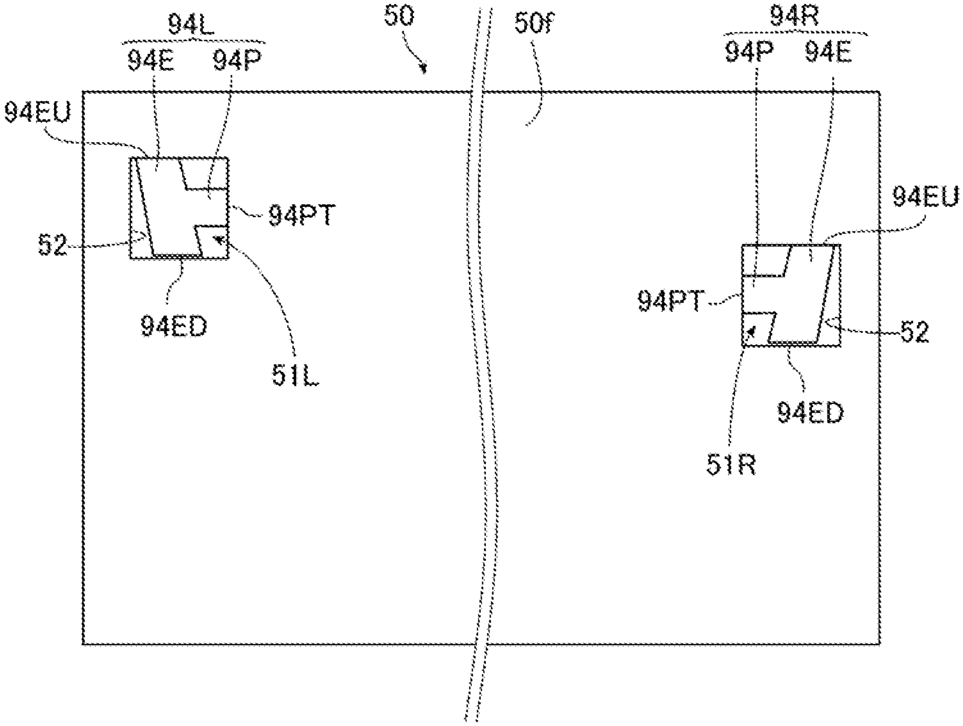
FIG. 12 is a diagram illustrating a part of a vehicle-mounted light source unit according to another modification of the present invention from the same viewpoint as FIG. 6.

In addition, in the above-described embodiments, the example in which the direction in which the pair of ribs is arranged is parallel to the left-right direction has been described, but the direction in which the pair of ribs is arranged may be inclined with respect to the left-right direction. In addition, in the above-described embodiments, the example in which the extending direction of the extending portion 94E of the rib is perpendicular to the height direction and the left-right direction of the rib has been described. However, it is sufficient if, when viewed along the height direction of the rib, the extending direction of the extending portion 94E is different from the direction in which the pair of ribs is arranged. FIG. 12 is a diagram illustrating another modification of the vehicle-mounted light source unit LU from the same viewpoint as FIG. 6.

As illustrated in FIG. 12, in this modification, the positions of the first rib 94L and the second rib 94R in the up-down direction are misaligned, and the first rib 94L is provided above the second rib 94R. Accordingly, the direction in which the first rib 94L and the second rib 94R are arranged is inclined with respect to the left-right direction. In addition, the extending direction of each of the extending portion 94E of the first rib 94L and the extending portion 94E of the second rib 94R is a direction inclined with respect to the up-down direction and different from the direction in which the pair of ribs is arranged. In this modification, in each of the first rib 94L and the second rib 94R, the upper end surface 94EU of the extending portion 94E faces the upper straight portion of the inner wall 52 and is substantially in surface contact with the straight portion along the left-right direction. In addition, in each of the first rib 94L and the second rib 94R, the lower end surface 94ED of the extending portion 94E faces the lower straight portion of the inner wall 52. In addition, in this modification, the protruding portion 94P of the first rib 94L protrudes rightward from the central portion of the extending portion 94E in the extending direction. In addition, the protruding portion 94P of the second rib 94R protrudes leftward from the central portion of the extending portion 94E in the extending direction. As described above, in this modification, the protruding portions 94P of both the first rib 94L and the second rib 94R protrude to the side on which the first rib 94L and the second rib 94R approach each other in the left-right direction perpendicular to the height direction of the ribs and different from the extending direction of the extending portion 94E. Note that, in this modification, the protruding portions 94P of both the first rib 94L and the second rib 94R may protrude to the side on which the first rib 94L and the second rib 94R are away from each other in the left-right direction perpendicular to the height direction of the ribs and different from the extending direction of the extending portion 94E. In addition, in this modification, the end surface 94PT of the protruding portion 94P of the first rib 94L faces the right straight portion of the inner wall 52 defining the first through-hole 51L and is substantially in surface contact with the straight portion along the up-down direction. In addition, the end surface 94PT of the protruding portion 94P of the second rib 94R faces the left straight portion of the inner wall 52 defining the second through-hole 51R and is substantially in surface contact with the straight portion along the up-down direction. Accordingly, in this modification, the end surface 94PT of the protruding portion 94P has an in-plane direction different from that of both end surfaces of the extending portion 94E.

As described above, the vehicle-mounted light source unit LU according to this modification includes the heat sink 80, which is a holding member, including the first rib 94L and the second rib 94R, which are a pair of ribs, and the substrate 50 disposed on the heat sink 80, including the first through-hole 51L and the second through-hole 51R, which are a pair of fitting portions, into which the first rib 94L and the second rib 94R are fitted, and on which the light sources 63*a* and 63*b* are mounted. Each of the first rib 94L and the second rib 94R includes the extending portion 94E and the protruding portion 94P. When viewed along the height direction of each of the first rib 94L and the second rib 94R, the extending portions 94E of the first rib 94L and the second rib 94R extend in a direction different from the direction in which the first rib 94L and the second rib 94R are arranged, and the upper end surface 94EU and the lower end surface 94ED, which are both end surfaces in the extending direction, have a planar shape. In addition, when viewed as described above, the protruding portions 94P of the first rib 94L and the second rib 94R protrude from a part of the extending portions 94E to the side on which the first rib 94L and the second rib 94R approach each other in a direction different from the extending direction of the extending portion 94E, and the end surfaces 94PT in the protruding direction have a planar shape having an in-plane direction different from that of the upper end surface 94EU and the lower end surface 94ED of the extending portion 94E. In addition, each of the first through-hole 51L and the second through-hole 51R, which are fitting portions, includes the pair of first facing portions facing the upper end surface 94EU and the lower end surface 94ED of the extending portion 94E, and the second facing portion facing the end surface 94PT of the protruding portion 94P.

Accordingly, similarly to the above-described embodiments, the movement of the substrate 50 along the left-right direction with respect to the heat sink 80 is restricted by the abutment between the end surface 94PT of the protruding portion 94P of one rib and the second facing portion of one fitting portion to which the rib is fitted or the abutment between the end surface 94PT of the protruding portion 94P of the other rib and the second facing portion of the other fitting portion to which the rib is fitted, and the substrate 50 is positioned with respect to the heat sink 80 in the left-right direction. In addition, each of the pair of ribs includes the extending portion 94E extending in a direction different from the height direction and the left-right direction of the rib, and each of the pair of fitting portions includes a pair of first facing portions facing both end surfaces of the extending portion 94E. In addition, the in-plane direction of both end surfaces of the extending portion 94E is different from the in-plane direction of the end surface 94PT of the protruding portion 94P. Accordingly, when the substrate 50 moves with respect to the heat sink 80 along the direction perpendicular to the left-right direction and the height direction of the rib, the substrate is restricted from moving with respect to the heat sink along the direction perpendicular to both the left-right direction and the height direction of the rib by the abutment between one of both end surfaces of the extending portion 94E and one of the pair of first facing portions of the fitting portion or the abutment between the other of both end surfaces of the extending portion 94E and the other of the pair of first facing portions of the fitting portion, and the substrate 50 is positioned with respect to the heat sink 80 in the direction perpendicular to both the left-right direction and the height direction of the rib. In addition, in this modification, similarly to the above-described embodiments, both end surfaces of the extending portion 94E are in surface contact with the first facing portions of the fitting portion, and the end surface 94PT of the protruding portion 94P is in surface contact with the second facing portion of the fitting portion. Accordingly, stress concentration on the abutment portion can be suppressed, and a decrease in positioning accuracy between the substrate 50 and the heat sink 80 can be suppressed. In addition, in this modification, similarly to the above-described embodiments, since the rib has the configuration in which the protruding portion 94P is added to the extending portion 94E, the rigidity of the rib can be secured to suppress the deformation of the rib, and a decrease in the positioning accuracy can be suppressed. In addition, in this modification, since both ends of the extending portion 94E abut on the fitting portion of the substrate 50, the abutment area between the rib and the fitting portion in the extending direction of the extending portion 94E can be reduced. In addition, in this modification, since the end surface of the protruding portion 94P protruding from a part of the extending portion 94E abuts on the fitting portion of the substrate 50, the abutment area between the rib and the fitting portion in the protruding direction of the protruding portion 94P can be reduced. As described above, according to this modification, since the abutment area between the rib and the fitting portion can be reduced, it is hardly affected by the accuracy of surface machining, and it is possible to suppress the optical axis misalignment of the light emitted from the light sources.

In addition, in the above-described embodiments, the example in which the vehicular lighting tool on which the vehicle-mounted light source unit LU is mounted is the vehicular headlight 1 has been described. However, the vehicular lighting tool on which the vehicle-mounted light source unit LU is mounted may be, for example, a lighting tool mounted on a rear portion of the vehicle or a lighting tool mounted on a side portion.

In addition, in the above-described embodiments, the example has been described in which the protruding portions 94P of both the first rib 94L and the second rib 94R protrude to the side on which the first rib 94L and the second rib 94R approach each other or to the side on which the first rib 94L and the second rib 94R are away from each other in the left-right direction. However, in the direction different from the extending direction of the extending portion 94E, the protruding portions 94P of both the first rib 94L and the second rib 94R may protrude to the side on which the first rib 94L and the second rib 94R approach each other or to the side on which the first rib 94L and the second rib 94R are away from each other in the direction different from the left-right direction.

In addition, in the above-described embodiments, the example in which the holding member is the heat sink 80 has been described, but the holding member is not limited to the heat sink 80.

According to the present invention, there is provided a vehicle-mounted light source unit capable of accurately positioning a substrate on which a light source is mounted and a holding member that holds the substrate and capable of suppressing optical axis misalignment, and the vehicle-mounted light source unit can be used in the field of automobiles and the like.

The invention claimed is:

1. A vehicle-mounted light source unit comprising:

a holding member that includes a pair of ribs; and a substrate that is disposed on the holding member, includes a pair of fitting portions into which the respective ribs are fitted, and on which a light source is mounted, wherein when viewed along a height direction of each of the ribs, each of the ribs includes:

an extending portion that extends in a direction different from a direction in which the pair of ribs is arranged, and has both end surfaces having a planar shape, and a protruding portion that protrudes from a part of the extending portion to a side on which the pair of ribs approach each other or are away from each other in a direction different from an extending direction of the extending portion, and has an end surface having a planar shape having an in-plane direction different from an in-plane direction of both end surfaces of the extending portion, and each of the fitting portions includes:

a pair of first facing portions facing both end surfaces of the extending portion, and a second facing portion facing the end surface of the protruding portion.

2. The vehicle-mounted light source unit according to claim 1, wherein when viewed along a height direction of each of the ribs, a position of the end surface of the protruding portion in the extending direction is between both end surfaces of the extending portion.

3. The vehicle-mounted light source unit according to claim 2, wherein when viewed along the height direction of each of the ribs, the protruding portion extends in a direction perpendicular to the extending direction from a central portion of the extending portion in the extending direction.

4. The vehicle-mounted light source unit according to claim 1, wherein the protruding portion of each of the ribs protrudes from a part of the extending portion to a side on which the pair of ribs approach each other.

5. The vehicle-mounted light source unit according to claim 1, wherein a protruding direction of the protruding portion of each of the ribs is parallel to a left-right direction, and an abutment area between the end surface of the extending portion and the first facing portion is larger than an abutment area between the end surface of the protruding portion and the second facing portion.

6. The vehicle-mounted light source unit according to claim 1, wherein a protruding direction of the protruding portion of each of the ribs is parallel to a left-right direction, and a length along the extending direction of the extending portion is longer than a length along the protruding direction of the protruding portion.

* * * * *